(12) United States Patent
Yokoo

(10) Patent No.: US 9,254,746 B2
(45) Date of Patent: Feb. 9, 2016

(54) DRIVING FORCE TRANSMISSION DEVICE AND VEHICLE HAVING SAID DRIVING FORCE TRANSMISSION DEVICE

(75) Inventor: Takami Yokoo, Nagoya (JP)

(73) Assignee: TOYOTA JIDOSHA KABUSHIKI KAISHA, Achi (JP)

( * ) Notice: Subject to any disclaimer, the term of this patent is extended or adjusted under 35 U.S.C. 154(b) by 99 days.

(21) Appl. No.: 14/129,491

(22) PCT Filed: Jun. 28, 2011

(86) PCT No.: PCT/JP2011/064753
§ 371 (c)(1),
(2), (4) Date: Dec. 26, 2013

(87) PCT Pub. No.: WO2013/001598
PCT Pub. Date: Jan. 3, 2013

(65) Prior Publication Data
US 2014/0135168 A1    May 15, 2014

(51) Int. Cl.
| F16D 27/115 | (2006.01) |
| B60K 17/34 | (2006.01) |
| B60K 17/35 | (2006.01) |
| B60K 23/08 | (2006.01) |
| B60K 6/52 | (2007.10) |
| B60K 17/344 | (2006.01) |
| B60K 6/48 | (2007.10) |

(52) U.S. Cl.
CPC . *B60K 23/08* (2013.01); *B60K 6/48* (2013.01); *B60K 6/52* (2013.01); *B60K 17/344* (2013.01); *B60K 17/351* (2013.01); *B60K 17/35* (2013.01); B60K 2006/4808 (2013.01); B60Y 2400/424 (2013.01); *F16D 27/115* (2013.01); Y02T 10/626 (2013.01); Y02T 10/6221 (2013.01); Y02T 10/6265 (2013.01); Y10T 74/19614 (2015.01); Y10T 477/32 (2015.01); Y10T 477/613 (2015.01)

(58) Field of Classification Search
CPC ..... B60K 17/344; B60K 17/35; F16D 27/115
See application file for complete search history.

(56) References Cited

U.S. PATENT DOCUMENTS

| 4,890,510 | A | * | 1/1990 | Inui | ............................... | 475/226 |
| 4,978,329 | A | | 12/1990 | Yasui et al. | | |
| 7,533,754 | B2 | | 5/2009 | Burrows et al. | | |
| 2009/0235780 | A1 | * | 9/2009 | Zink | ........................... | 74/665 A |

FOREIGN PATENT DOCUMENTS

| DE | 38 41 234 A1 | 8/1989 |
| EP | 1 826 089 B1 | 8/2007 |

(Continued)

*Primary Examiner* — Tisha Lewis
(74) *Attorney, Agent, or Firm* — Sughrue Mion, PLLC

(57) ABSTRACT

In a 4WD vehicle that is basically an FF type, a propeller shaft 4 includes, on a front end and a rear end thereof, respective driving force transmission devices 3 and 5. The propeller shaft 4 includes an electric motor 41, and when the electric motor 41 is rotated in a backward direction of the vehicle during a 2WD state, a hypoid ring gear 36 of a transfer mechanism 32 of the driving force transmission device 3 is moved so as to engage a clutch mechanism 31. By such an engagement, engine torque is transmitted to the driving force transmission device 5 via the propeller shaft 4. Thus, a hypoid ring gear 56 of a transfer mechanism 52 of the driving force transmission device 5 is moved so as to engage a clutch mechanism 51. Accordingly, a drive state is switched to a 4WD state.

12 Claims, 12 Drawing Sheets

(56) References Cited

FOREIGN PATENT DOCUMENTS

| JP | 61146637 A | * | 7/1986 |
| JP | 01-136754 U | | 9/1989 |
| JP | 03135840 A | * | 6/1991 |
| JP | 04095641 A | * | 3/1992 |
| JP | 05-8096 U | | 2/1993 |
| JP | 2002-370557 A | | 12/2002 |
| JP | 2003-127687 A | | 5/2003 |
| JP | 2007-223588 A | | 9/2007 |
| JP | 2008-307923 A | | 12/2008 |

* cited by examiner

When 2WD→4WD switch is completed

When 4WD→2WD switch is performed

When EV backward travel is performed

DRIVING FORCE TRANSMISSION DEVICE AND VEHICLE HAVING SAID DRIVING FORCE TRANSMISSION DEVICE

CROSS REFERENCE TO RELATED APPLICATIONS

This application is a National Stage of International Application No. PCT/JP2011/064753 filed Jun. 28, 2011, the contents of all of which are incorporated herein by reference in their entirety.

TECHNICAL FIELD

The present invention relates to a driving force transmission device transmitting driving force from a driving force source such as an engine and a vehicle having the driving force transmission device. Particularly, the present invention relates to modification of a mechanism to switch the driving force between transmission and non-transmission.

BACKGROUND ART

Conventionally, as disclosed in Patent Literatures 1 and 2 listed herein below, a vehicle is known where a two-wheel drive state and a four-wheel drive state are switchable. Such a vehicle can be switched between the four-wheel drive state (hereinafter also referred to as a four-wheel drive mode) suitable for running on a rough road and the two-wheel drive state (hereinafter also referred to as a two-wheel drive mode) suitable for improving an energy consumption rate (in an internal combustion engine, a fuel consumption rate).

Specifically, each vehicle in the above Patent Literatures is a four-wheel drive vehicle that is basically an FF (front-engine front-drive) type, which includes a front side connection/disconnection mechanism to connect/disconnect torque transmission between a front differential and a propeller shaft, and a rear side connection/disconnection mechanism to connect/disconnect torque transmission between the propeller shaft and a rear differential. When traveling in the four-wheel drive mode, the respective connection/disconnection mechanisms are connected so as to transmit engine torque to rear wheels via the propeller shaft and the rear differential. On the other hand, when traveling in the two-wheel drive mode, the respective connection/disconnection mechanisms are released (disconnected) so as to stop the rotation of the propeller shaft during travel by not transmitting the engine torque and rotation force of the rear wheels (rotation force where the rear wheels are rotated by friction with a road surface) to the propeller shaft while being in the two-wheel drive state using only the front wheels. Thus, fluctuation or noises generated by the rotation of the propeller shaft are reduced. Also, the fuel consumption rate is improved by reduction of power loss.

PRIOR ART REFERENCES

Patent Literatures

[Patent Literature 1] JP 2003-127687A
[Patent Literature 2] JP 2002-370557A

SUMMARY OF THE INVENTION

Problems to be Solved by the Invention

However, in the vehicles disclosed by the above Patent Literatures, the front side connection/disconnection mecha-nism and the rear side connection/disconnection mechanism both include an actuator (electronic control actuator) such as an electromagnetic solenoid. For this reason, each connection/disconnection mechanism is large in size as well as large in mass, and the production cost thereof is high. Also, when traveling in the four-wheel drive mode, it is necessary to constantly apply current to the actuators. Therefore, when the travel is continued in the four-wheel drive mode, electrical power consumption is increased, which results in problems in the fuel consumption rate or in durability. Especially, when a large torque is needed to the rear wheels when running on the rough road, it is necessary to apply a large current to the actuator of the rear side connection/disconnection mechanism, thus the aforesaid problem becomes remarkable.

The present invention was made in consideration of such circumstances, and an object thereof is to provide a driving force transmission device in which electrical power consumption can considerably be reduced, and to provide a vehicle having the driving force transmission device.

Means for Solving Problem

SUMMARY OF THE INVENTION

To achieve the above object in the present invention, in a driving force transmission device that transmits driving force using spiral bevel gears, a clutch mechanism is connected to the spiral bevel gears. When torque is transmitted to the spiral bevel gears, engagement/disengagement of the clutch mechanism is switched using the fact that a load acts in a direction along respective axial lines of the gears. That is, according to the torque transmitted to the spiral bevel gears, transmission/non-transmission of the driving force by the clutch mechanism and the spiral bevel gears can be switched.

Solving Means

Specifically, in the present invention, a driving force transmission device includes: an engaging/disengaging unit capable of changing transmission of torque by operating along an rotation axis center thereof; a first spiral bevel gear attached to the engaging/disengaging unit so as to rotate together with the engaging/disengaging unit; and a second spiral bevel gear constituting, with the first spiral bevel gear, a paired spiral bevel gear that are hypoid gears by engaging with each other, in which the first spiral bevel gear is moved along a rotation axis center thereof according to engaging tooth faces at the time when power is transmitted between the first spiral bevel gear and the second spiral bevel gear, and accordingly, the engaging/disengaging unit operates along the rotation axis center thereof.

With the above features, when power is transmitted between the first spiral bevel gear and the second spiral bevel gear that constitute the paired spiral bevel gear, engaging tooth faces of the first spiral bevel gear and the second spiral bevel gear are determined according to a power transmission direction. And, when the power is transmitted between the first spiral bevel gear and the second spiral bevel gear by contact at the respective engaging tooth faces that face in one direction, the first spiral bevel gear is moved in one direction along the rotation axis center thereof. On the other hand, when the power is transmitted between the first spiral bevel gear and the second spiral bevel gear by contact at the respective engaging tooth faces that face in the other direction, the first spiral bevel gear is moved in the other direction along the rotation axis center thereof. Since the engaging/disengaging unit is integrally rotatably attached to the first spiral bevel gear, the engaging/disengaging unit operates along the rotation axis center according to the movement of the first spiral bevel gear. Thus, according to the movement direction of the first spiral bevel gear, the engaging/disengaging unit is switched between an engaged state and a disengaged state. That is, according to the power transmission direction to the paired spiral bevel gear, the engaging/disengaging unit is switched between the engaged state and the disengaged state.

In the conventional driving force transmission devices, the engaging/disengaging unit is switched between the engaged state and the disengaged state by operations of an actuator (electronic control actuator), therefore power should be constantly distributed to the actuator during the engagement of the engaging/disengaging unit. Thus, there are problems of energy consumption rate or durability. In contrast, in the driving force transmission device of this solving means, the engaging/disengaging unit is switched between the engaged state and the disengaged state using the power transmitted to the paired spiral bevel gear. Thus, if the power at the time of switching is continuously transmitted, the state of the engaging/disengaging unit (i.e. engaged state or disengaged state) is maintained. For this reason, there is no need to include the electronic control actuator, and electrical power consumption can be remarkably reduced.

Also, an operation direction of the engaging/disengaging unit along the rotation axis center thereof according to the engaging tooth faces of the respective spiral bevel gears is determined by a pressure angle and a helix angle of teeth of each of the spiral bevel gears, and an offset size between the rotation axis center of the first spiral bevel gear and that of the second spiral bevel gear.

In the hypoid gear, as parameters (dimensions) to determine the operation direction of the engaging/disengaging unit along the rotation axis center thereof according to the engaging tooth faces of the respective spiral bevel gears, the offset size between the rotation axis center of the first spiral bevel gear and that of the second spiral bevel gear can be add to a pressure angle and a helix angle of the teeth. Thus, the number of parameters can be increased, which results in enhancement of a degree of design freedom to determine the operation direction of the engaging/disengaging unit. Furthermore, by suitably determining these dimensions, the operation direction of the engaging/disengaging unit along the rotation axis center thereof can be desirably determined.

A relationship between the power transmission direction to the paired spiral bevel gear and operations of the engaging/disengaging unit includes, in particular, the following. That is, the first spiral bevel gear is moved along the rotation axis center thereof so that the engaging/disengaging unit operates to be in an engaging side, while respective engaging tooth faces of the first spiral bevel gear and the second spiral bevel gear make contact with each other to transmit power, and the respective engaging tooth faces are used, among the tooth faces, for performing a normal rotation by receiving driving force from a driving force source.

On the other hand, the first spiral bevel gear is moved along the rotation axis center thereof so that the engaging/disengaging unit operates to be in an disengaging side, while respective engaging tooth faces of the first spiral bevel gear and the second spiral bevel gear make contact with each other to transmit power, and the respective engaging tooth faces are used, among the tooth faces, for performing a normal rotation when the driving force source is in a driven state.

In this way, the engaging/disengaging unit can be switched between the engagement and the disengagement according to the power transmission direction to the paired spiral bevel gear, that is, the engaging tooth faces of the first spiral bevel gear and the second spiral bevel gear. When the engaging tooth faces, which are normally rotated receiving the driving force from the driving force source, make contact with each other, the engaging/disengaging unit operates to be in the engaging side, thus the driving force is transmitted by the engaging/disengaging unit and the paired spiral bevel gear. On the other hand, when the engaging tooth faces, which are normally rotated in the driven state of the driving force source, make contact with each other, the engaging/disengaging unit operates to be in the disengaging side, thus the driving force is not transmitted by the engaging/disengaging unit. For example, when the driving force transmitting state to the rear wheels of a four-wheel drive vehicle is switched by the engaging/disengaging unit, it is possible to switch the drive state between the four-wheel drive state and the two-wheel drive state.

The configuration in which the driving force transmission device is mounted on the vehicle includes, in particular, the following. The driving force source outputting driving force for travel is included, and when torque transmitted from the driving force source to the paired spiral bevel gear is larger than torque that the wheels receive from a road surface, respective forward side engaging tooth faces of the first spiral bevel gear and the second spiral bevel gear make contact with each other so that the first spiral bevel gear is moved in one direction along the rotation axis center thereof, thereby the engaging/disengaging unit operates to be in the engaging side. And when the torque transmitted from the driving force source to the paired spiral bevel gear is smaller than the torque that the wheels receive from the road surface, respective backward side engaging tooth faces of the first spiral bevel gear and the second spiral bevel gear make contact with each other so that the first spiral bevel gear is moved in the other direction along the rotation axis center thereof, thereby the engaging/disengaging unit operates to be in the disengaging side.

For this reason, when the torque transmitted from the driving force source to the paired spiral bevel gear is increased according to a stepping operation of an accelerator pedal by a driver of the vehicle, the first spiral bevel gear is moved in one direction along the rotation axis center thereof so that the engaging/disengaging unit operates to be in the engaging side. Thus, by the engagement of the engaging/disengaging unit, the torque can be transmitted to the other wheels (for example, rear wheels). On the other hand, the torque transmitted from the driving force source to the paired spiral bevel gear is decreased according to a releasing operation of the stepped accelerator pedal by the driver, the first spiral bevel gear is moved in the other direction along the rotation axis center thereof so that the engaging/disengaging unit operates to be in the disengaging side. Thus, by the disengagement of the engaging/disengaging unit, the torque is not transmitted to the other wheels (for example, rear wheels). In this way, by use of the torque transmitted from the driving force source to the paired spiral bevel gear, it is possible to switch the wheels to which the torque is transmitted without any special actuator.

The configuration in which the driving force transmission device is applied to a standby four-wheel drive vehicle includes, in particular, the following. A propeller shaft that extends in a forward-backward direction of a vehicle body includes the respective driving force transmission devices on a front end side and a rear end side, and an electric motor that gives rotation force to the propeller shaft. And, when the two-wheel drive state in which the respective engaging/disengaging units of the driving force transmission devices are in the disengaged state is switched to the four-wheel drive state, rotation force in the backward direction of the vehicle is given to the propeller shaft by the electric motor, and in the driving force transmission device provided on the front end side of the propeller shaft, the forward side engaging tooth faces of the first spiral bevel gear and the second spiral bevel gear make contact with each other so that the engaging/disengaging unit operates to be in the engaging side, and by such an operation of the engaging/disengaging unit to be in the engaging side, rotation force in the forward direction of the vehicle is given to the propeller shaft by the driving force from the driving force source. In the driving force transmission device provided on the rear end side of the propeller shaft, the forward side engaging tooth faces of the first spiral bevel gear and the second spiral bevel gear make contact with each other so that the engaging/disengaging unit operates to be in the engaging side, accordingly the drive state is switched to the four-wheel drive state.

On the other hand, when the four-wheel drive state in which the respective engaging/disengaging units of the driving force transmission devices are in the engaged state is switched to the two-wheel drive state, the driving force source is turned in a driven state by the driver's accelerator OFF operation, and in the driving force transmission device provided on the front end side of the propeller shaft, the backward side engaging tooth faces of the first spiral bevel gear and the second spiral bevel gear make contact with each other so that the engaging/disengaging unit operates to be in the disengaging side. And, by such an operation of the engaging/disengaging unit to be in the disengaging side, the torque that is transmitted from the driving force source to the paired spiral bevel gear in the driving force transmission device provided on the rear end side of the propeller shaft is smaller than the torque that the wheels receive from the road surface, and the backward side engaging tooth faces of the first spiral bevel gear and the second spiral bevel gear make contact with each other so that the engaging/disengaging unit operates to be in the disengaging side, accordingly the drive state is switched to the two-wheel drive state.

In this way, the electric motor is driven only at the time when switching of the two-wheel drive state to the four-wheel drive state is started. It is not necessary to drive the electric motor during travel in the four-wheel drive state and at the time when the four-wheel drive state is switched to the two-wheel drive state. Thus, electrical power consumption can be remarkably reduced. Also, when the vehicle travels in the two-wheel drive state, each engaging/disengaging unit is disengaged. Thereby, the rotation of the propeller shaft can be stopped. Thus, fluctuation or noises are not generated by the rotation of the propeller shaft, and the energy consumption rate is improved by reduction of power loss.

The configuration to perform the travel using the electric motor includes, in particular, the following. When the driving force source is stopped, the rotation force in the forward direction of the vehicle is given to the propeller shaft by the electric motor. In the driving force transmission device provided on the rear end side of the propeller shaft, the forward side engaging tooth faces of the first spiral bevel gear and the second spiral bevel gear make contact with each other so that the engaging/disengaging unit operates to be in the engaging side. By such an operation of the engaging/disengaging unit to the engaging side, a forward travel using the rear wheels as the drive wheels can be performed by the rotation force in the forward direction generated by the electric motor.

Also, when the driving force source is stopped, the rotation force in the backward direction of the vehicle is given to the propeller shaft by the electric motor. In the driving force transmission device provided on the front end side of the propeller shaft, the forward side engaging tooth faces of the first spiral bevel gear and the second spiral bevel gear make contact with each other so that the engaging/disengaging unit operates to be in the engaging side. By such an operation of the engaging/disengaging unit to be in the engaging side, a backward travel using the front wheels as the drive wheels can be performed by the rotation force in the backward direction generated by the electric motor.

Thus, using the electric motor that operates at the time when the switching of the two-wheel drive state to the four-wheel drive state is started, it is possible to travel the vehicle forward using the rear wheels as the drive wheels and to travel the vehicle backward using the front wheels as the drive wheels. Thus, quietness during these travels can be improved and the fuel consumption can be reduced in the case that the driving force source is an internal combustion engine.

Furthermore, when the propeller shaft includes an electronic control coupling that can change a transmission amount of the driving force to the rear wheels by changing a driving force distribution ratio between the front wheels and the rear wheels, it is possible to arbitrarily adjust the driving force distribution ratio between the front wheels and the rear wheels. Thus, the four-wheel drive can be performed with the driving force distribution ratio suitable for the road surface state.

Furthermore, as an applying position of the driving force transmission device, it may be disposed only on the front end side, or only on the rear end side, of the propeller shaft.

Especially, when the driving force transmission device is disposed only on the rear end of the propeller shaft, increase of the driving force from the driving force source causes the engaging/disengaging unit to be engaged by making contact with the forward side engaging tooth faces of the respective spiral bevel gears. That is, it is possible to switch the drive state from the two-wheel drive state to the four-wheel drive state without need of the electric motor. Therefore, the electric motor can be omitted. Furthermore, the configuration in which the driving force transmission device is applied to a vehicle also includes the following: an engaging/disengaging unit capable of changing transmission of torque by operating along an rotation axis center thereof, a first spiral bevel gear attached to the engaging/disengaging unit so as to rotate together with the engaging/disengaging unit, and a second spiral bevel gear constituting a paired spiral bevel gear with the first spiral bevel gear by engaging with each other, in which the first spiral bevel gear is moved along a rotation axis center thereof according to engaging tooth faces at a time when power is transmitted between the first spiral bevel gear and the second spiral bevel gear, and accordingly, the engaging/disengaging unit operates along the rotation axis center thereof. The vehicle including the driving force transmission device also includes a driving force source outputting driving force for travel, in which, when torque transmitted from the driving force source to the paired spiral bevel gear is larger than torque that the wheels receive from a road surface, respective forward side engaging tooth faces of the first spiral bevel gear and the second spiral bevel gear make contact with each other so that the first spiral bevel gear is moved in one direction along the rotation axis center thereof, thereby the engaging/disengaging unit operates to be in an engaging side, and in which, when the torque transmitted from the driving force source to the paired spiral bevel gear is smaller than the torque that the wheels receive from the road surface, respective backward side engaging tooth faces of the first spiral bevel gear and the second spiral bevel gear make contact with each other so that the first spiral bevel gear is moved in the other direction along the rotation axis center thereof, thereby the engaging/disengaging unit operates to be in an disengaging side.

Effects of the Invention

In the present invention, the engaging/disengaging unit is integrally rotatably attached to the spiral bevel gear. When torque is transmitted to the spiral bevel gear, engagement/disengagement of the engaging/disengaging unit is switched using the fact that a load acts in a direction along an axis line of the gears. For this reason, there is no need to include the electronic control actuator that switches the engaging/disengaging unit, and electrical power consumption can be remarkably reduced.

MODE FOR CARRYING OUT THE INVENTION

Hereinafter, embodiments of the present invention will be described with reference to the accompanying drawings. In the embodiments, the present invention is applied to a vehicle that adopts a standby four-wheel drive system based on FF (front-engine front-drive) system.

The First Embodiment

Figure 1:
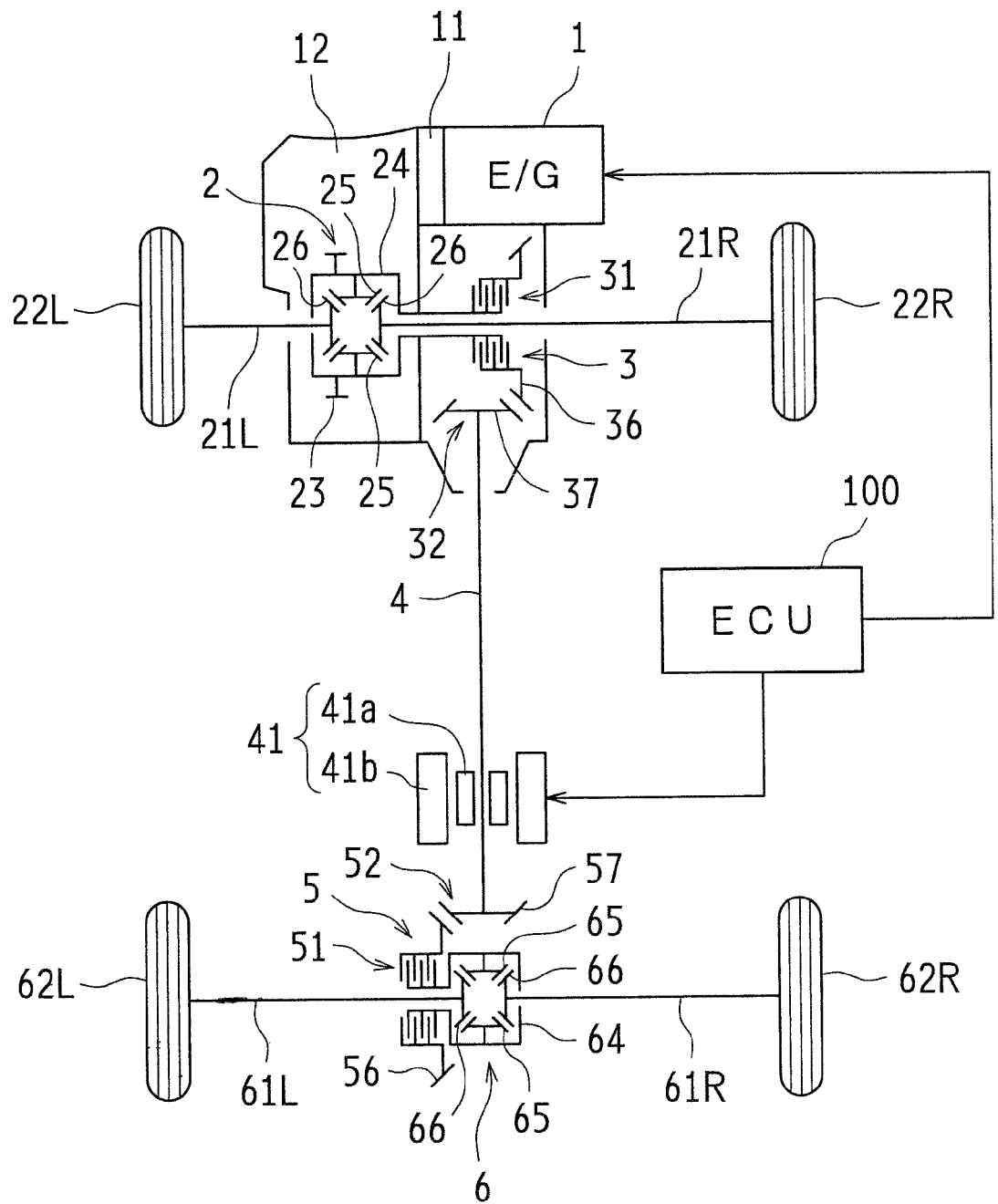
FIG. 1 is a diagram showing a schematic configuration of a drive system of a vehicle according to the first embodiment.

First, the first embodiment will be described. FIG. 1 is a diagram showing a schematic configuration of a drive system of a vehicle according to this embodiment.

As shown in FIG. 1, the vehicle according to this embodiment includes an engine 1 that generates driving force for travel (hereinafter also referred to as "torque"), a torque converter 11, an automatic transmission 12, a front differential device 2, a front wheel shafts (front drive shafts) 21L, 21R, front wheels 22L, 22R, a front-side driving force transmission device 3, a propeller shaft 4, a rear-side driving force transmission device 5, a rear differential device 6, rear wheel shafts (rear drive shafts) 61L, 61R, a rear wheels 62L, 62R, an ECU (Electronic Control Unit) 100 and the like.

Next, description will be given on respective parts such as the engine 1, the torque converter 11, the automatic transmission 12, the front differential device 2, the front-side driving force transmission device 3, the propeller shaft 4, the rear-side driving force transmission device 5, the rear differential device 6 and the ECU 100.

(Engine)

The engine 1 is a known power unit (driving force source) that burns fuel to output driving force, which is constituted by a gasoline engine, a diesel engine and the like. For example, in the gasoline engine, the ECU 100 controls a drive state such as a throttle opening degree (intake air amount) of a throttle valve (not shown) disposed in an intake passage, a fuel injection amount and ignition timing.

(Torque Converter)

The torque converter 11 includes an input side pump impeller, an output side turbine runner (both not shown) and the like. Power transmission is performed between the pump impeller and the turbine runner via fluid (hydraulic fluid). The pump impeller is connected to a crankshaft that is an output shaft of the engine 1. The turbine runner is connected to an input shaft of the automatic transmission 12 via a turbine shaft.

(Automatic Transmission)

The automatic transmission 12 is, for example, a multi-stage (planetary gear type) automatic transmission to set a gear stage using friction engagement devices (such as a clutch and a brake) and planetary gear devices. Note that the automatic transmission 12 may be a belt type continuously variable transmission (CVT) that can continuously adjust the gear ratio. Also, the transmission may be a manual transmission.

To an output shaft of the automatic transmission 12, an output gear (not shown) is integrally rotatably connected. The output gear is engaged with a differential driven gear 23 of the front differential device 2. The driving force (driving force from the engine 1) transmitted to the output shaft of the automatic transmission 12 is transmitted to the left and right front wheels 22L, 22R via the front differential device 2 and the front wheel shafts 21L, 21R.

(Front Differential Device)

In the front differential device 2, the differential driven gear 23 is integrally provided with a differential case 24. Furthermore, the front differential device 2 may have any configuration if it can perform a differential operation to differentially distribute the torque to the left and right front wheel shafts 21L, 21R. In the example shown in FIG. 1, the front differential device 2 is used, which includes a pair of pinion gears 25, 25 and a pair of side gears 26, 26 that are respectively engaged with each other to be rotated. The pinion gears 25, 25 and the side gears 26, 26 are housed in the differential case 24.

(Front-Side Driving Force Transmission Device)

The front-side driving force transmission device 3, which is one of the features of this embodiment, is configured by integrally assembling a clutch mechanism (engaging/disengaging unit) 31 that switches the driving force between transmission and non-transmission, and a transfer mechanism (paired spiral bevel gear) 32 that switches the transmission direction of the driving force (between a vehicle width direction and a forward-backward direction of a vehicle body).

Figure 2:
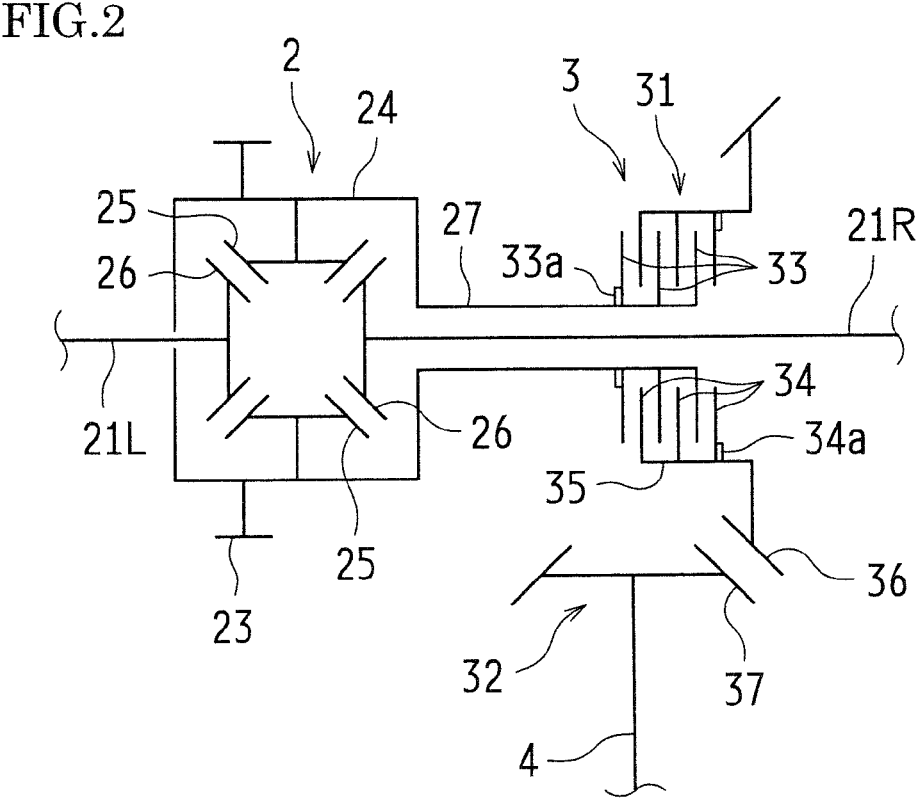
FIG. 2 is an enlarged schematic view showing a front differential device and a front-side driving force transmission device.

FIG. 2 is an enlarged schematic view showing these clutch mechanism 31 and transfer mechanism 32.

The clutch mechanism 31 is constituted by wet type multiple disc clutches. A plurality of clutch plates (friction plates) 33 and a plurality of clutch discs (friction plates) 34 are respectively alternately disposed in an axial direction of the front wheel shaft 21R. (For example, a clearance between the clutch plate 33 and the clutch disc 34 is set to substantially 0.8 mm.) The clearance size is not limited thereto, but is preferably set as smaller as possible to the extent that the torque is not transmitted between the clutch plate 33 and the clutch disc 34.

Each clutch plate 33 is spline fit to an outer peripheral surface of a cylinder-shaped rear wheel side output shaft 27 that extends from the differential case 24 in the axial direction of the front wheel shaft 21R, so that the clutch plate 33 can be integrally rotated and be moved in the axial direction relative to the rear wheel side output shaft 27. Note that the front wheel shaft 21R is inserted into the rear wheel side output shaft 27, and is connected to the front wheel 22R.

On the other hand, the clutch disc 34 is spline fit to an inner peripheral surface of a cylinder-shaped clutch case 35 that is mounted on an inner peripheral end of a hypoid ring gear (first spiral bevel gear) 36 (described later) that constitutes the transfer mechanism 32, so that the clutch disc 34 can be integrally rotated and be moved in the axial direction relative to the clutch case 35.

On an outer surface of the rear wheel side output shaft 27 is mounted a snap ring 33a that restricts movement, toward the front differential device 2, of the clutch plate 33 disposed at the most adjacent position to the front differential device 2 among the clutch plates 33. Also, on an inner surface of the clutch case 35 is mounted a snap ring 34a that restricts movement, toward the hypoid ring gear 36, of the clutch disc 34 disposed at the most adjacent position to the hypoid ring gear 36 among the clutch discs 34.

Thus, when the hypoid ring gear 36 goes backward from the front differential device 2 (moves to the right side in FIGS. 1 and 2), the clearances between the respective clutch plates 33 and the respective clutch discs 34 are relatively large, and a clutch disengaged state is established, where the torque is not transmitted between the clutch plates 33 and the clutch discs 34. On the other hand, when the hypoid ring gear 36 goes forward toward the front differential device 2 (moves to the left side in FIGS. 1 and 2), the clearances between the respective clutch plates 33 and the respective clutch discs 34 are relatively small, or each clutch plate 33 and the corresponding clutch disc 34 make contact with each other. Thus, the torque is transmitted between the clutch plates 33 and the clutch discs 34. That is, a clutch engaged state is established. The principle of forward/backward movement of the hypoid ring gear 36 will be described later.

The transfer mechanism 32 is constituted by the hypoid gears. Specifically, the hypoid ring gear 36 and a hypoid pinion gear (second spiral bevel gear) 37 are engaged with each other. The clutch case 35 is mounted on the hypoid ring gear 36 so as to be integrally rotated. The rotation axis center of the hypoid ring gear 36 extends in the vehicle width direction. The propeller shaft 4 is mounted on the hypoid pinion gear 37 so as to be integrally rotated. The rotation axis center of the hypoid pinion gear 37 extends the forward-backward direction of the vehicle body.

Figure 4:
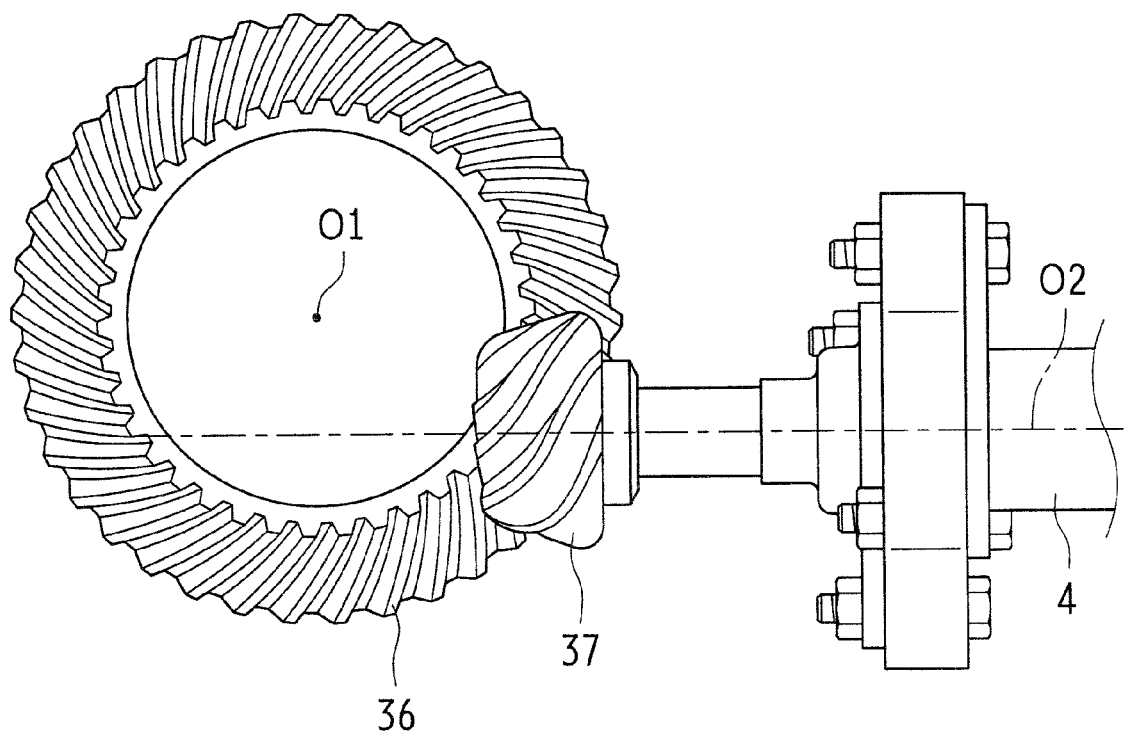
FIG. 4 is a side view showing a hypoid gear that constitutes a transfer mechanism.

As shown in FIG. 4, the hypoid ring gear 36 and the hypoid pinion gear 37 are constituted by the spiral bevel gears whose respective rotation axis centers O1 and O2 are offset with each other. Also, the rotation axis center O2 of the hypoid pinion gear 37 is located lower than the rotation axis center O1 of the hypoid ring gear 36. The front wheel shaft 21R is inserted into an inner space of the hypoid ring gear 36.

Dimensions of the hypoid ring gear 36 and the hypoid pinion gear 37, which constitute the transfer mechanism 32, include, for example, a pressure angle and a helix angle of each spiral tooth, an offset size of the rotation axis centers O1 and O2, and the like. When the torque is transmitted between the hypoid ring gear 36 and the hypoid pinion gear 37, a load is generated in the direction of the rotation axis center O1 relative to the hypoid ring gear 36. According to the above dimensions, the generating direction and the size of the load are determined. Hereinafter, the load is referred to as a "load in the axial direction". When the load in the axial direction is generated in the left side in FIGS. 1 and 2 (direction in which the hypoid ring gear 36 goes forward toward the front differential device 2), the clearances between the respective clutch plates 33 and the respective clutch discs 34 become relatively small in the clutch mechanism 31. Thus, the torque is transmitted between the clutch plates 33 and the clutch discs 34. That is, the clutch engaged state is established. On the other hand, when the load in the axial direction is generated in the right side in FIGS. 1 and 2 (direction in which the hypoid ring gear 36 separates apart from the front differential device 2), the clearances between the respective clutch plates 33 and the respective clutch discs 34 become relatively large in the clutch mechanism 31. Thus, the torque is not transmitted between the clutch plates 33 and the clutch discs 34. That is, the clutch disengaged state is established.

In this embodiment, the above dimensions are set so that the load in the axial direction in which the hypoid ring gear 36 goes forward toward the front differential device 2 is generated when contact force is generated between the tooth faces (engaging tooth faces) of the hypoid ring gear 36 and the tooth faces (engaging tooth faces) of the hypoid pinion gear 37. Both tooth faces make contact with each other in a state in which forward torque (in the forward travel direction of the vehicle) is transmitted from the hypoid ring gear 36 to the hypoid pinion gear 37 (i.e. a state in which the forward torque is transmitted with the hypoid ring gear 36 being turned to a drive side and the hypoid pinion gear 37 being turned to a driven side; in other words, the first spiral bevel gear and the second spiral bevel gear in the present invention receive driving force transmitted from the driving force source to perform a normal rotation). In this case, the respective tooth faces of the hypoid ring gear 36 and the hypoid pinion gear 37 that make contact with each other are forward side engaging tooth faces in the present invention.

By the forward movement of the hypoid ring gear 36, the clearances between the respective clutch plates 33 and the respective clutch discs 34 become relatively small in the clutch mechanism 31. Thus, the torque is transmitted between the clutch plates 33 and the clutch discs 34. That is, the clutch engaged state is established. Such a forward movement of the hypoid ring gear 36 is also performed in a state in which backward torque (in the backward travel direction of the vehicle) is transmitted from the hypoid pinion gear 37 to the hypoid ring gear 36 (i.e. a state in which the backward travel side torque is transmitted with the hypoid pinion gear 37 being turned to a drive side and the hypoid ring gear 36 being turned to a driven side). This is because contact force of the tooth faces of the hypoid ring gear 36 and the tooth faces of the hypoid pinion gear 37 that make contact with each other is generated in the same direction when backward torque is transmitted from the hypoid pinion gear 37 to the hypoid ring gear 36 and when forward torque is transmitted from the hypoid ring gear 36 to the hypoid pinion gear 37.

Inversely, the above dimensions are set so that the load in the axial direction in which the hypoid ring gear 36 goes backward from the front differential device 2 is generated when contact force is generated between the tooth faces of the hypoid ring gear 36 and the tooth faces of the hypoid pinion gear 37. Both tooth faces make contact with each other in a state in which forward torque is transmitted from the hypoid pinion gear 37 to the hypoid ring gear 36 (i.e. a state in which the forward torque is transmitted with the hypoid pinion gear 37 being turned to a drive side and the hypoid ring gear 36 being turned to a driven side; in other words, the first spiral bevel gear and the second spiral bevel gear in the present invention performs a normal rotation when the driving force source is in a driven state). In this case, the respective tooth faces of the hypoid ring gear 36 and the hypoid pinion gear 37 that make contact with each other are backward side engaging tooth faces in the present invention.

By the backward movement of the hypoid ring gear 36, the clearances between the respective clutch plates 33 and the respective clutch discs 34 become relatively large in the clutch mechanism 31. Thus, the torque is not transmitted between the clutch plates 33 and the clutch discs 34. That is, the clutch disengaged state is established. Such a backward movement of the hypoid ring gear 36 is also performed in a state in which backward torque is transmitted from the hypoid ring gear 36 to the hypoid pinion gear 37 (i.e. a state in which the backward torque is transmitted with the hypoid ring gear 36 being turned to a drive side and the hypoid pinion gear 37 being turned to a driven side). This is because contact force of the tooth faces of the hypoid ring gear 36 and the tooth faces of the hypoid pinion gear 37 that make contact with each other is generated in the same direction when backward torque is transmitted from the hypoid ring gear 36 to the hypoid pinion gear 37 and when forward torque is transmitted from the hypoid pinion gear 37 to the hypoid ring gear 36.

In order to perform the aforesaid operations, the dimensions of the hypoid ring gear 36 and the hypoid pinion gear 37 (the pressure angle and the helix angle of each spiral tooth, and the offset size of the rotation axis centers O1 and O2) are obtained in advance by experiments and simulations.

(Rear Differential Device)

The rear differential device 6 can perform a differential operation to differentially distribute the torque to the left and right rear wheel shafts 61L, 61R, and includes a pair of pinion gears 65, 65 and a pair of side gears 66, 66 that are respectively engaged with each other to be rotated. The pinion gears 65, 65 and the side gears 66, 66 are housed in a differential case 64. The rear differential device 6 may have any configuration if it can perform the differential operation.

(Rear-Side Driving Force Transmission Device)

Figure 3:
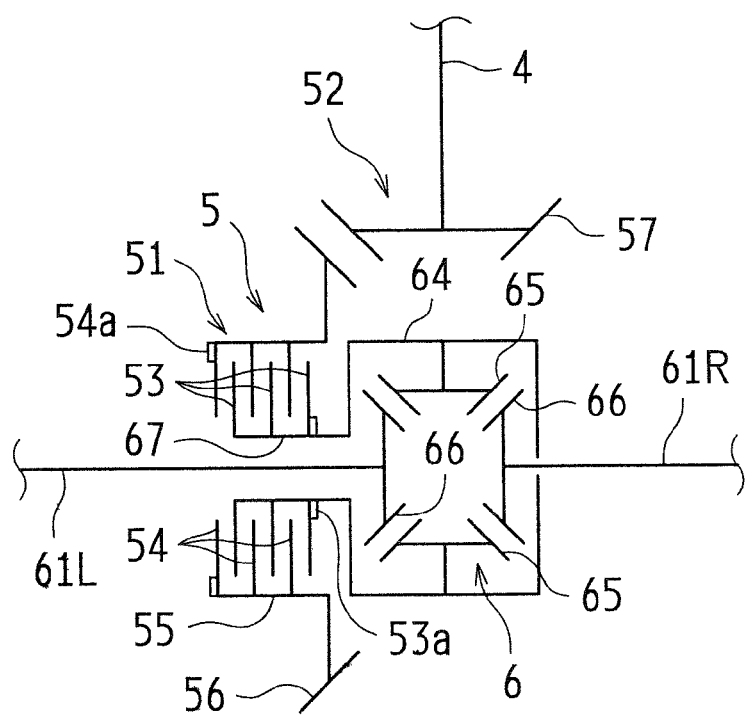
FIG. 3 is an enlarged schematic view showing a rear differential device and a rear-side driving force transmission device.

The rear-side driving force transmission device 5, which is one of the features of this embodiment, is configured by integrally assembling a clutch mechanism (engaging/disengaging unit) 51 that switches the driving force between transmission and non-transmission, and a transfer mechanism (paired spiral bevel gear) 52 that switches the transmission direction (between the forward-backward direction of the vehicle body and the vehicle width direction) of the driving force. FIG. 3 is an enlarged schematic view showing these clutch mechanism 51 and transfer mechanism 52.

The clutch mechanism 51 is constituted by wet type multiple disc clutches. A plurality of clutch plates (friction plates) 53 and a plurality of clutch discs (friction plates) 54 are respectively alternately disposed in an axial direction of the rear wheel shaft 61L. (For example, a clearance between the clutch plate 53 and the clutch disc 54 is set to substantially 0.8 mm.) The clearance size is not limited thereto, but is preferably set as smaller as possible to the extent that the torque is not transmitted between the clutch plate 53 and the clutch disc 54.

Each clutch plate 53 is spline fit to an outer peripheral surface of a cylinder-shaped rear wheel side intput shaft 67 that extends from the differential case 64 in the axial direction of the rear wheel shaft 61L, so that the clutch plate 53 can be integrally rotated and be moved in the axial direction relative to the rear wheel side input shaft 67. Note that the rear wheel shaft 61L is inserted into the rear wheel side input shaft 67, and is connected to the rear wheel 62L.

On the other hand, the clutch disc 54 is spline fit to an inner peripheral surface of a cylinder-shaped clutch case 55 that is mounted on an inner peripheral end of a hypoid ring gear (first spiral bevel gear) 56 (described later) that constitutes the transfer mechanism 52, so that the clutch disc 54 can be integrally rotated and be moved in the axial direction relative to the clutch case 55.

On an outer surface of the rear wheel side input shaft 67 is mounted a snap ring 53a that restricts movement, toward the rear differential device 6, of the clutch plate 53 disposed at the most adjacent position to the rear differential device 6 among the clutch plates 53. Also, on an inner surface of the clutch case 55 is mounted a snap ring 54a that restricts movement to space apart from the rear differential device 6, of the clutch disc 54 disposed at the most spaced-apart position from the rear differential device 6 among the clutch discs 54.

Thus, when the hypoid ring gear 56 goes backward from the rear differential device 6 (moves to the left side in FIGS. 1 and 3), the clearances between the respective clutch plates 53 and the respective clutch discs 54 are relatively large, and a clutch disengaged state is established, where the torque is not transmitted between the clutch plates 53 and the clutch discs 54. On the other hand, when the hypoid ring gear 56 goes forward toward the rear differential device 6 (moves to the right side in FIGS. 1 and 3), the clearances between the respective clutch plates 53 and the clutch discs 54 are relatively small, or each clutch plate 53 and the corresponding clutch disc 54 make contact with each other. Thus, the torque is transmitted between the clutch plates 53 and the clutch discs 54. That is, a clutch engaged state is established. The principle of forward/backward movement of the hypoid ring gear 56 will be described later.

Similarly to the transfer mechanism 32 of the front-side driving force transmission device 3, the transfer mechanism 52 is constituted by the hypoid gears. Specifically, a hypoid pinion gear (second spiral bevel gear) 57 and a hypoid ring gear 56 are engaged with each other. The propeller shaft 4 is mounted on the hypoid pinion gear 57 so as to be integrally rotated. The rotation axis center of the hypoid pinion gear 57 extends in the forward-backward direction of the vehicle body. The clutch case 55 is mounted on the hypoid ring gear 56 so as to be integrally rotated. The rotation axis center of the hypoid ring gear 56 extends in the vehicle width direction. The configuration of the hypoid ring gear 56 and the hypoid pinion gear 57 is substantially the same as that of the gears 36 and 37 of the aforesaid front-side driving force transmission device 3, thus description on the gears 56 and 57 is omitted.

Dimensions of the hypoid ring gear 56 and the hypoid pinion gear 57, which constitute the transfer mechanism 52, include, for example, a pressure angle and a helix angle of each spiral tooth, an offset size of the rotation axis centers, and the like. When the torque is transmitted between the hypoid ring gear 56 and the hypoid pinion gear 57, a load is generated in the direction of the rotation axis center relative to the hypoid ring gear 56 (i.e. "load in the axial direction"). According to the above dimensions, the generating direction and the size of the load in the axial direction are determined. When the load in the axial direction is generated in the right side in FIGS. 1 and 3 (direction in which the hypoid ring gear 56 goes forward toward the rear differential device 6), the clearances between the respective clutch plates 53 and the respective clutch discs 54 become relatively small in the clutch mechanism 51. Thus, the torque is transmitted between the clutch plates 53 and the clutch discs 54. That is, the clutch engaged state is established. On the other hand, when the load in the axial direction is generated in the left side in FIGS. 1 and 3 (direction in which the hypoid ring gear 56 spaces apart from the rear differential device 6), the clearances between the respective clutch plates 53 and the respective clutch discs 54 become relatively large in the clutch mechanism 51. Thus, the torque is not transmitted between the clutch plates 53 and the clutch discs 54. That is, the clutch disengaged state is established.

In this embodiment, the above dimensions are set so that the load in the axial direction in which the hypoid ring gear 56 goes forward toward the rear differential device 6 is generated when contact force is generated between the tooth faces of the hypoid pinion gear 57 and the tooth faces of the hypoid ring gear 56. Both tooth faces make contact with each other in a state in which forward torque is transmitted from the hypoid pinion gear 57 to the hypoid ring gear 56 (i.e. a state in which the forward torque is transmitted with the hypoid pinion gear 57 being turned to a drive side and the hypoid ring gear 56 being turned to a driven side; in other words, the first spiral bevel gear and the second spiral bevel gear in the present invention receive driving force transmitted from the driving force source to perform a normal rotation). In this case, the respective tooth faces of the hypoid ring gear 56 and the hypoid pinion gear 57 that make contact with each other are forward side engaging tooth faces in the present invention.

By the forward movement of the hypoid ring gear 56, the clearances between the respective clutch plates 53 and the respective clutch discs 54 become relatively small in the clutch mechanism 31. Thus, the torque is transmitted between the clutch plates 53 and the clutch discs 54. That is, the clutch engaged state is established. Such a forward movement of the hypoid ring gear 56 is also performed in a state in which backward torque is transmitted from the hypoid ring gear 56 to the hypoid pinion gear 57 (i.e. a state in which the backward torque is transmitted with the hypoid ring gear 56 being turned to a drive side and the hypoid pinion gear 37 being turned to a driven side). This is because contact force of the tooth faces of the hypoid pinion gear 57 and the tooth faces of the hypoid ring gear 56 that make contact with each other is generated in the same direction when backward torque is transmitted from the hypoid ring gear 56 to the hypoid pinion gear 57 and when forward torque is transmitted from the hypoid pinion gear 57 to the hypoid ring gear 56.

Inversely, the above dimensions are set so that the load in the axial direction in which the hypoid ring gear 56 goes backward from the rear differential device 6 is generated when contact force is generated between the tooth faces of the hypoid pinion gear 57 and the tooth faces of the hypoid ring gear 56. Both tooth faces make contact with each other in a state in which backward torque is transmitted from the hypoid pinion gear 57 to the hypoid ring gear 56 (i.e. a state in which the backward torque is transmitted with the hypoid pinion gear 57 being turned to a drive side and the hypoid ring gear 56 being turned to a driven side). In this case, the respective tooth faces of the hypoid ring gear 56 and the hypoid pinion gear 57 that make contact with each other are backward side engaging tooth faces in the present invention.

By the backward movement of the hypoid ring gear 56, the clearances between the respective clutch plates 53 and the respective clutch discs 54 become relatively large in the clutch mechanism 51. Thus, the torque is not transmitted between the clutch plates 53 and the clutch discs 54. That is, the clutch disengaged state is established. Such a backward movement of the hypoid ring gear 56 is also performed in a state in which forward torque is transmitted from the hypoid ring gear 56 to the hypoid pinion gear 57 (i.e. a state in which the forward torque is transmitted with the hypoid ring gear 56 being turned to a drive side and the hypoid pinion gear 57 being turned to a driven side; in other words, the first spiral bevel gear and the second spiral bevel gear in the present invention performs a normal rotation when the driving force source is in a driven state). This is because contact force of the tooth faces of the hypoid pinion gear 57 and the tooth faces of the hypoid ring gear 56 that make contact with each other is generated in the same direction when forward torque is transmitted from the hypoid ring gear 56 to the hypoid pinion gear 57 and when backward torque is transmitted from the hypoid pinion gear 57 to the hypoid ring gear 56.

In order to perform the aforesaid operations, the dimensions of the hypoid ring gear 56 and the hypoid pinion gear 57 (the pressure angle and the helix angle of each spiral tooth, and the offset size of the rotation axis centers) are obtained in advance by experiments and simulations.

(Propeller Shaft)

The propeller shaft 4 transmits engine torque to the rear wheels 62L, 62R. The propeller shaft 4 extends in the forward-backward direction of the vehicle body. The hypoid pinion gear 37 of the front-side driving force transmission device 3 is integrally rotatably connected to the front end of the propeller shaft 4. The hypoid pinion gear 57 of the rear-side driving force transmission device 5 is integrally rotatably connected to the rear end of the propeller shaft 4.

An electric motor 41 is provided on the propeller shaft 4. The electric motor 41 includes a rotor 41a made of permanent magnet that is integrally rotatably attached to the propeller shaft 4 and a stator 41b around which a coil is wound. The rotation of the electric motor 41 is controlled by a control signal from the ECU 100.

For example, when backward torque (in the backward travel direction of the vehicle) is generated in the rotor 41a of the electric motor 41 by the control signal from the ECU 100, the torque in the same direction is generated at the propeller shaft 4. The backward torque is transmitted from the hypoid pinion gear 37 to the hypoid ring gear 36 in the front-side driving force transmission device 3, thus, as mentioned before, the clutch mechanism 31 is turned in the engaged state by the forward movement of the hypoid ring gear 36. In this case, the backward torque is transmitted from the hypoid pinion gear 57 to the hypoid ring gear 56 in the rear-side driving force transmission device 5, thus, as mentioned before, the clutch mechanism 51 is turned in the disengaged state by the backward movement of the hypoid ring gear 56.

On the other hand, when forward torque (in the forward travel direction of the vehicle) is generated at the rotor 41a of the electric motor 41 by the control signal from the ECU 100, the torque in the same direction is generated at the propeller shaft 4. The forward torque is transmitted from the hypoid pinion gear 37 to the hypoid ring gear 36 in the front-side driving force transmission device 3, thus, as mentioned before, the clutch mechanism 31 is turned in the disengaged state by the backward movement of the hypoid ring gear 36. In this case, the forward torque is transmitted from the hypoid pinion gear 57 to the hypoid ring gear 56 in the rear-side driving force transmission device 5, thus, as mentioned before, the clutch mechanism 51 is turned in the engaged state by the forward movement of the hypoid ring gear 56.

(ECU)

The ECU 100 is an electronic control device that executes various kinds of control including drive control of the engine 1, control of the electric motor 41 and the like. The ECU 100 includes a CPU (central processing unit), ROM (read only memory), RAM (random access memory), a backup RAM and the like.

The ROM stores various control programs and maps that are referred when the control programs are executed. The CPU executes calculation processing based on the control programs and the maps stored in the ROM. The RAM is a memory that temporarily stores such as results of calculation by the CPU, and data input from sensors. The backup RAM is a non-volatile memory that stores data and the like that should be saved when the ignition switch (not shown) is OFF.

Figure 5:
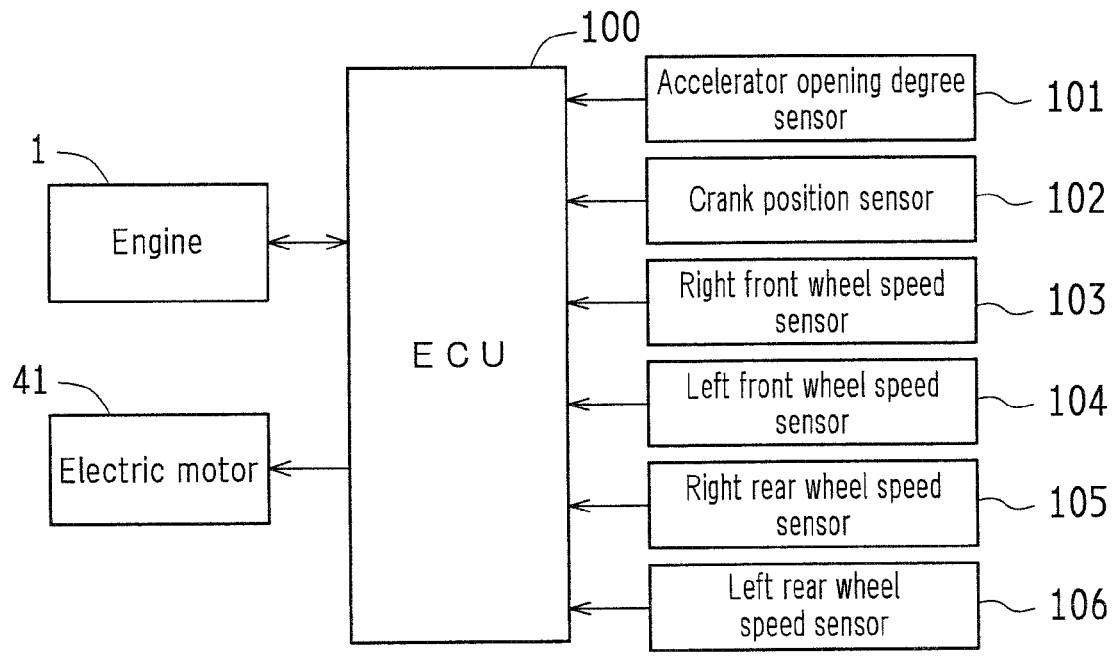
FIG. 5 is a block diagram showing a schematic configuration of the control system of the vehicle.

As shown in FIG. 5, to the ECU 100 are connected an accelerator opening degree sensor 101 that detects an accelerator opening degree Acc corresponding to a stepping amount of the accelerator pedal, a crank position sensor 102 that transmits a pulse signal each time the crankshaft is rotated by a prescribed angle, a right front wheel speed sensor 103 that detects a rotation speed (number of rotations) of the right front wheel 22R, a left front wheel speed sensor 104 that detects a rotation speed of the left front wheel 22L, a right rear wheel speed sensor 105 that detects a rotation speed of the right rear wheel 62R, a left rear wheel speed sensor 106 that detects a rotation speed of the left rear wheel 62L and the like. Note that the other sensors also are connected to the ECU 100, such as a steering angle sensor that detects a steering angle of a steering, a brake pedal sensor that detects ON/OFF of a brake pedal, a water temperature sensor that detects an engine cooling water temperature, a throttle opening degree sensor that detects an opening degree of a throttle valve disposed in a intake passage, an air flow meter that detects an intake air amount, a current sensor that detects a charging/discharging current of a battery, and a battery temperature sensor. Signals from the respective sensors are input to the ECU 100.

The ECU 100 executes various kinds of control of the engine 1 including control of the throttle opening degree (control of the intake air amount) of the engine 1, control of a fuel injection amount and control of an ignition timing based on the output signals of the respective sensors as described above. Also, the ECU 100 executes control of the electric motor 41 including "2WD-4WD switching control" and "EV travel control", which will be described later.

(Travel Mode)

In the vehicle according to the present embodiment, when the vehicle travels with a low speed and driving efficiency of the engine 1 is not good, the vehicle can travel with only the electric motor 41 (hereinafter also referred to as an "EV travel"). Such an EV travel is also performed when a driver selects the EV drive mode using a drive mode select switch disposed in a vehicle cabin.

On the other hand, when the vehicle travels normally by driving the engine 1 (hereinafter also referred to as an "engine travel"), a two-wheel drive travel (2WD travel) in which the driving force of the engine 1 is transmitted to only the front wheels 22L, 22R or a four-wheel drive travel (4WD travel) in which the driving force of the engine 1 is transmitted to the front wheels 22L, 22R and the rear wheels 62L, 62R is selectively performed based on a road surface condition and the like. The 2WD travel or the 4WD travel is also selectively performed by an operation by the driver of a 2WD-4WD select switch disposed in the vehicle cabin.

Figure 6:
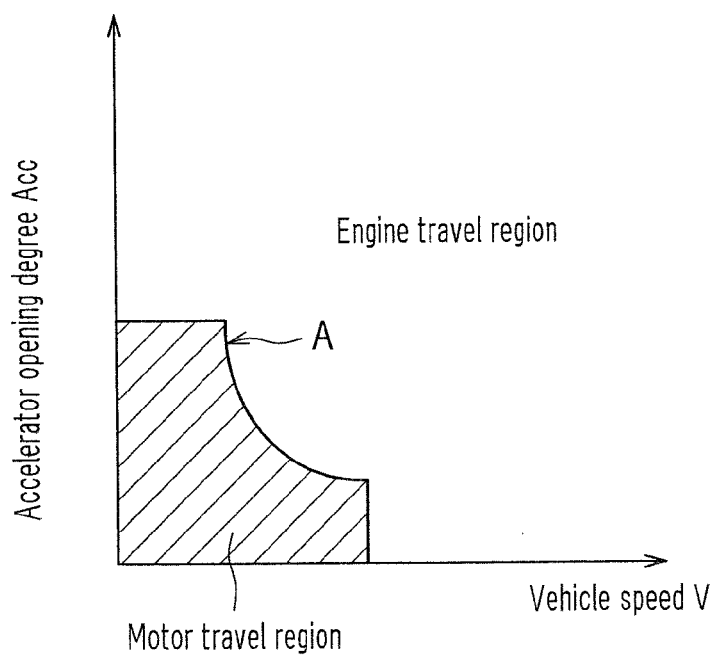
FIG. 6 is a diagram showing a map for selecting driving force to switch a motor travel and an engine travel based on a vehicle speed and an accelerator opening degree.

Next, description will be given on switching of the travel mode between the EV travel and the engine travel. FIG. 6 is a diagram showing a map for selecting driving force to switch the EV travel and the engine travel based on a vehicle speed V and the accelerator opening degree Acc. In FIG. 6, a solid line A is a boundary line between an engine travel region and a motor travel region. This boundary line is to switch the driving force source for start/travel of the vehicle (hereinafter referred to as "for travel") between the engine 1 and the electric motor 41, in other words, to switch the travel state between the engine travel to drive the vehicle using the engine 1 as the driving force source and the motor travel to drive the vehicle using the electric motor 41 as the driving force source. The map for selecting driving force indicated in FIG. 6 is constituted by a 2-dimensional coordinate that has the vehicle speed V and the accelerator opening degree Acc as parameters, which are stored in the ROM of the ECU 100 in advance.

The ECU 100 executes the motor travel or the engine travel by determining the current state is whether in the motor travel region or in the engine travel region based on the vehicle state indicated by the vehicle speed V and the accelerator opening degree Acc from the map for selecting driving force in FIG. 6. As it can be seen from FIG. 6, the motor travel is generally performed in case of a relatively low accelerator opening degree, i.e. a low load state where the engine efficiency is not good compared with a high-torque region, or in case of a relatively low vehicle speed, i.e. a low engine torque state.

(Vehicle Travel State)

Next, description will be given on the travel state of the vehicle configured as described above with reference to FIGS. 7-11. Hereinafter, operations to switch from the two-wheel drive travel (hereinafter also referred to as 2WD travel) to the four-wheel drive travel (hereinafter also referred to as 4WD travel) during engine travel, operations to switch from the 4WD travel to the 2WD travel during engine travel and operations in a state of the EV travel (EV forward travel and EV backward travel) will be described in this order.

With respect to arrows attached to the respective wheel shafts 21L, 21R, 61L and 61R in FIGS. 7-11, the solid arrows indicate the rotation state with being given the driving force by the torque transmission (the torque transmission from the engine 1 or the electric motor 41), i.e. the rotation state as the driving shaft. The dashed arrows indicate the rotation state by friction force with the road surface without being given the torque.

<Switching from 2WD to 4WD>

First, operations to switch the 2WD travel to the 4WD travel will be described. These operations are performed based on a request of the 4WD travel when an asphalt pavement on which the vehicle travels with the two-wheel drive mode is changed to a rough road or a low p road. For example, when the wheel speed sensors 103-106 generate detected signals that some wheels have been slipped, it is also detected that the vehicle travels on the low p road, and the 2WD travel is switched to the 4WD travel. Also, the 2WD travel is switched to the 4WD travel when the driver selects the 4WD travel mode by the 2WD-4WD select switch disposed in the vehicle cabin.

In the 2WD travel state, the clutch mechanisms 31 and 51 are disengaged states. For this reason, in the front-side driving force transmission device 3 and the rear-side driving force transmission device 5, the hypoid ring gears 36 and 56 and the hypoid pinion gears 37 and 57 are stopped. In the result, the propeller shaft 4 is not rotated, thus, fluctuation or noises generated by the rotation of the propeller shaft 4 are reduced. Also, the fuel consumption rate is improved by reduction of power loss.

Figure 7:
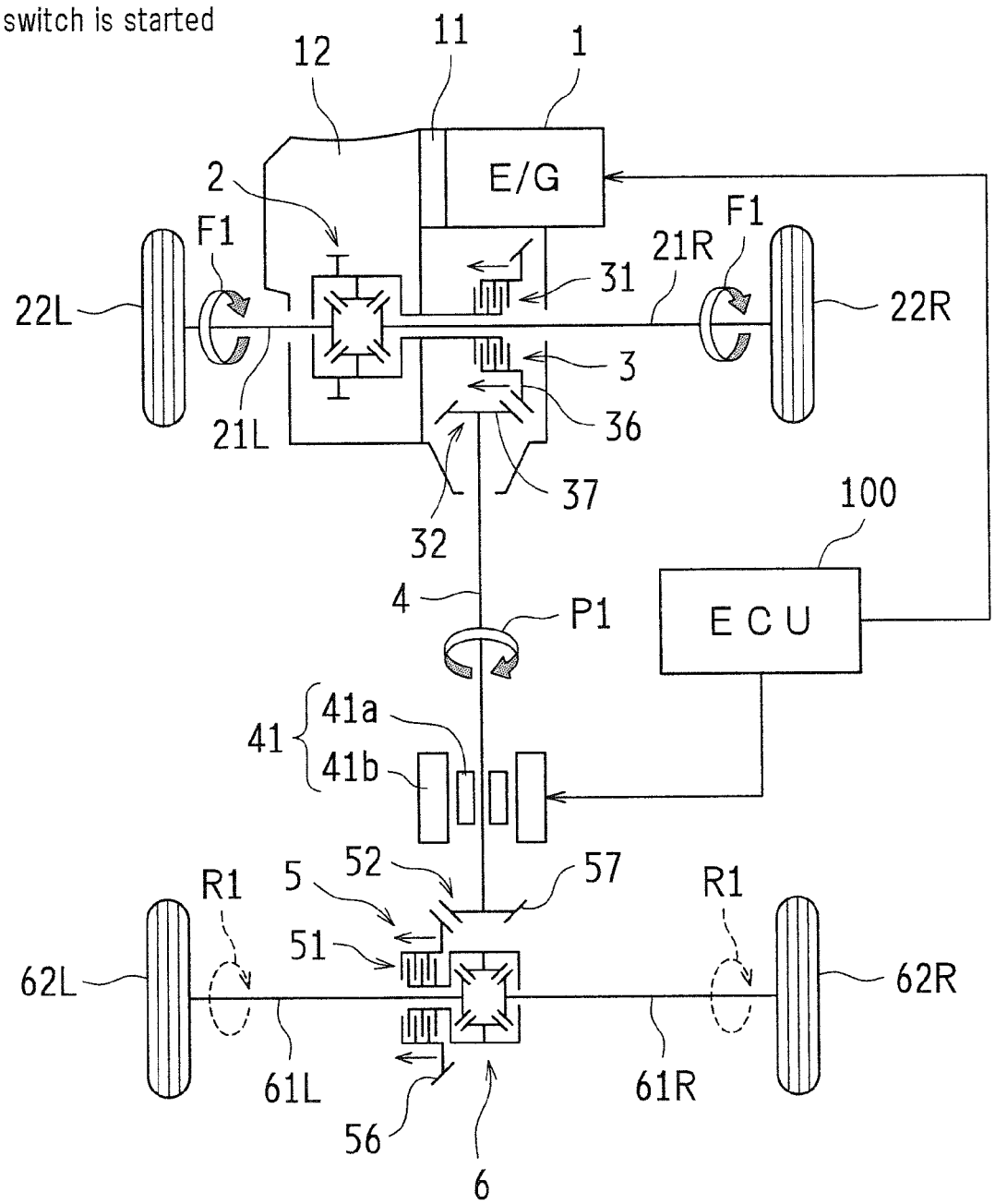
FIG. 7 is a diagram corresponding to FIG. 1 to indicate operations when switching from 2WD to 4WD is begun.

In such a 2WD travel state, when 4WD travel is requested, as shown in FIG. 7, the control signal from the ECU 100 causes the rotor 41a of the electric motor 41 to generate the backward torque (in the backward travel direction of the vehicle). Thus, the propeller shaft 4 is slightly rotated to the backward side of the vehicle (see the arrow P1 in FIG. 7).

This rotation of the propeller shaft 4 causes, in the front-side driving force transmission device 3, the backward torque to be transmitted from the hypoid pinion gear 37 to the hypoid ring gear 36. As described before, when the torque is transmitted in this direction, the respective forward side engaging tooth faces make contact with each other so that the hypoid ring gear 36 goes forward toward the front differential device 2 (see the arrow attached to the hypoid ring gear 36 in FIG. 7), and thereby, the clutch mechanism 31 is actuated to be in the engaged state. In this case, the engaged state of the clutch mechanism 31 (torque capacity of the clutch) is sufficient if the torque from the engine 1 is transmitted to the transfer mechanism 32. That is, it is sufficient if the torque is transmitted from the engine 1 while slip is generated between the clutch plates 33 and the clutch discs 34. For example, the clutch engaging force that is generated so as to transmit the torque from the engine 1 to the transfer mechanism 32 by viscosity of oil in the clutch case 35 will be sufficient.

Also, in the rear-side driving force transmission device 5, the backward torque is transmitted from the hypoid pinion gear 57 to the hypoid ring gear 56, the hypoid ring gear 56 goes backward to separate apart from the rear differential device 6 (see the arrow attached to the hypoid ring gear 56 in FIG. 7) and thereby, the disengaged state of the clutch mechanism 51 is maintained.

In this way, at the time of starting the engaging operation of the clutch mechanism 31 of the front-side driving force transmission device 3 (the time when a forward movement of the hypoid ring gear 36 of the clutch mechanism 31 is started according to the slight rotation of the propeller shaft 4 to the backward side of the vehicle), the driving force of the engine 1 is transmitted to the front wheel shafts 21L, 21R (see the arrow F1 attached to the front wheel shafts 21L, 21R) but is not yet transmitted to the rear wheel shafts 61L, 61R (see the dashed arrow R1 attached to the rear wheel shafts 61L, 61R).

Figure 8:
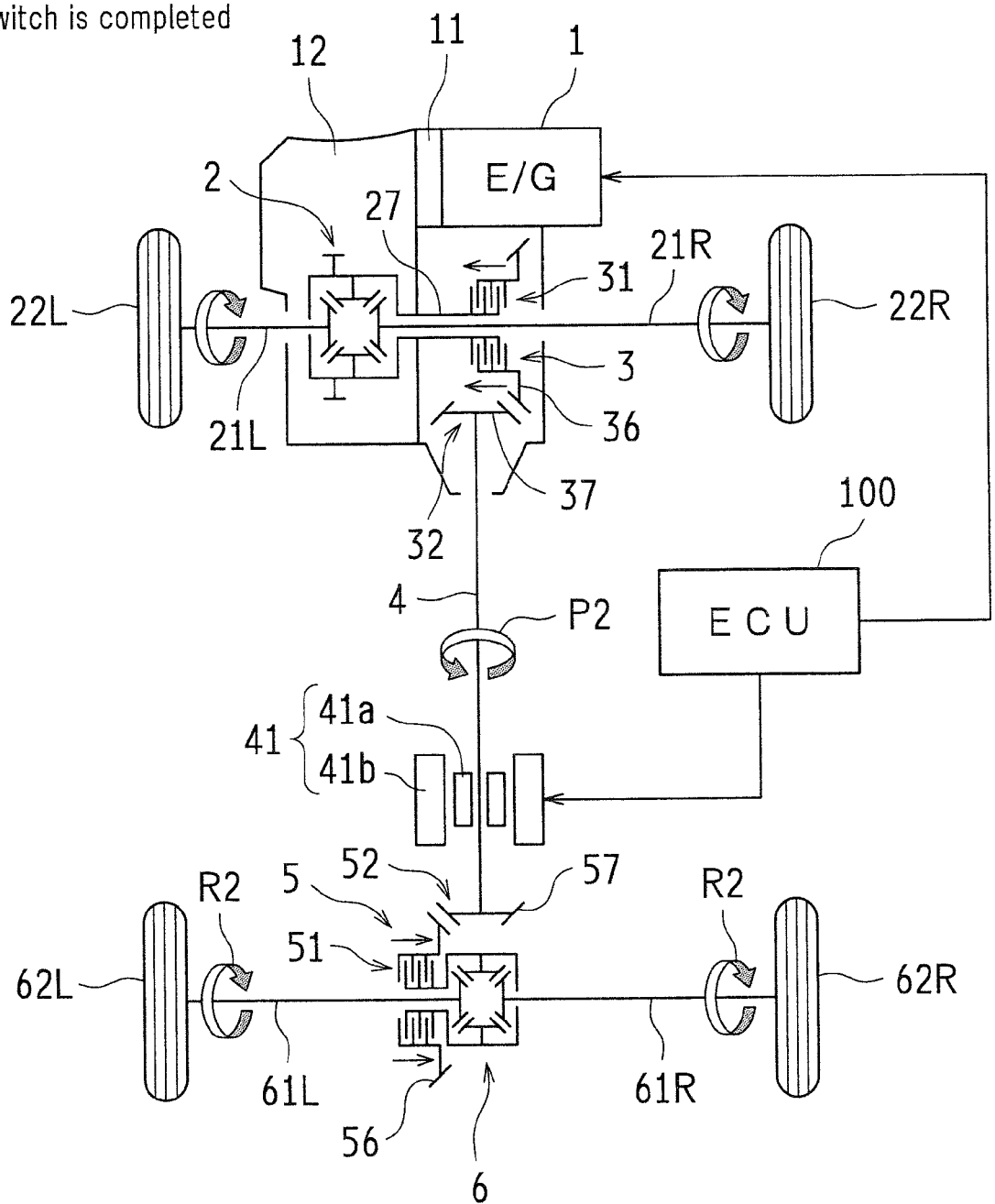
FIG. 8 is a diagram corresponding to FIG. 1 to indicate operations when switching from 2WD to 4WD is completed.
Figure 9:
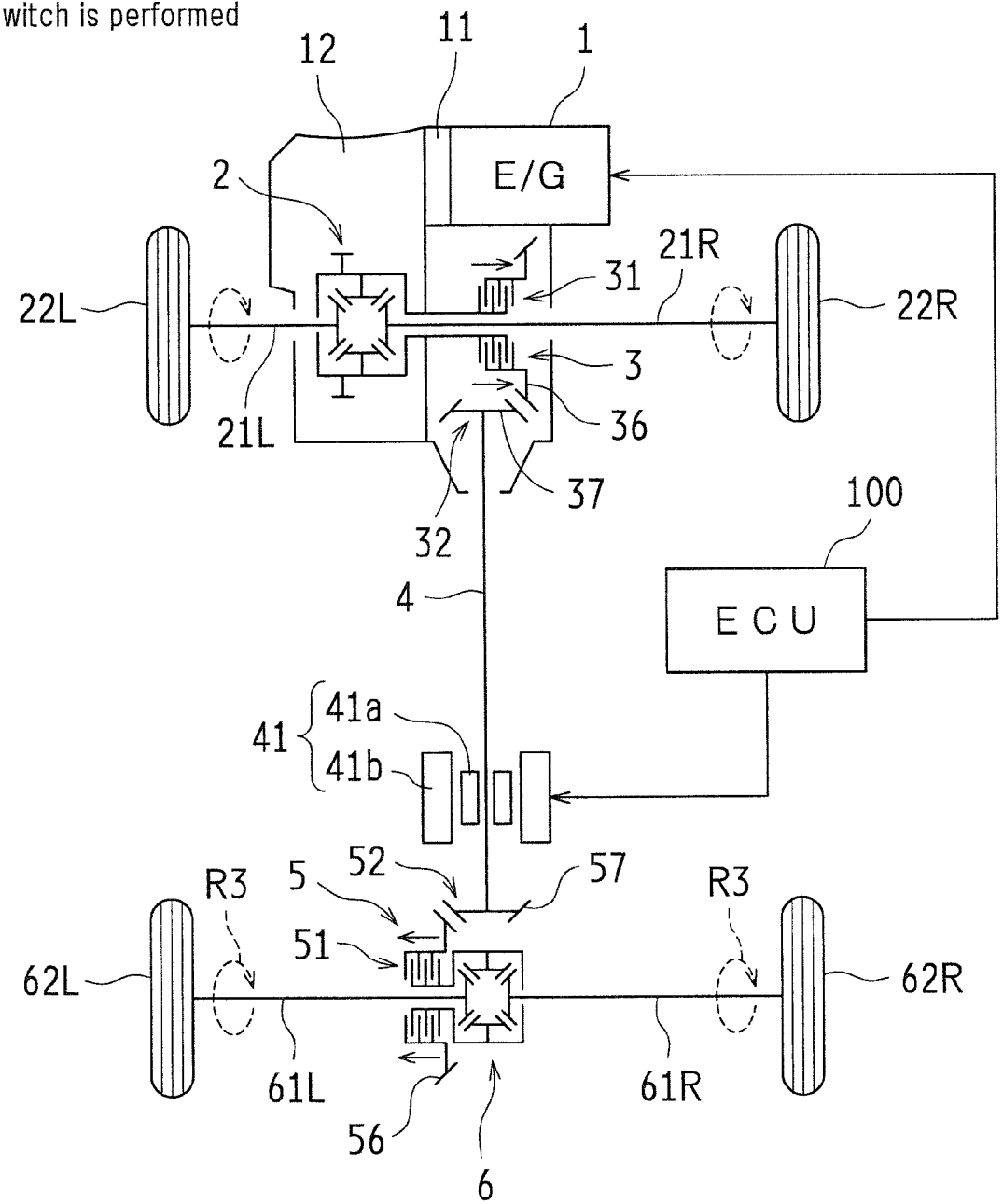
FIG. 9 is a diagram corresponding to FIG. 1 to indicate operations when switching from 4WD to 2WD is conducted.

Then, when the clutch mechanism 31 of the front-side driving force transmission device 3 is in the engaged state, the torque of the engine 1 is transmitted to the propeller shaft 4 via the rear wheel side output shaft 27, the clutch mechanism 31 and the transfer mechanism 32, as shown in FIG. 8. By such a torque transmission from the engine 1 to the transfer mechanism 32, relatively large forward torque is transmitted from the hypoid ring gear 36 to the hypoid pinion gear 37, and the hypoid ring gear 36 further goes forward toward the front differential device 2. Thereby, the clutch mechanism 31 is engaged with large engaging force.

By such an engaging of the clutch mechanism 31, the propeller shaft 4 is rotated to the forward side by receiving the torque from the engine 1 (see the arrow P2 in FIG. 8). The rotation force of the propeller shaft 4 is transmitted to the transfer mechanism 52 of the rear-side driving force transmission device 5. In the transfer mechanism 52, the forward torque is transmitted from the hypoid pinion gear 57 to the hypoid ring gear 56. As described above, when the torque is transmitted in this direction, the respective forward side engaging tooth faces make contact with each other so that the hypoid ring gear 56 goes forward toward the rear differential device 6 (see the arrow attached to the hypoid ring gear 56 in FIG. 8), and thereby, the clutch mechanism 51 is in the engaged state.

In this way, both clutch mechanisms 31 and 51 are in the engaged state, and the driving force from the engine 1 is transmitted to the rear wheels 62L, 62R via the propeller shaft 4, the transfer mechanism 52, the clutch mechanism 51, the rear differential device 6 and the rear wheel shafts 61L, 61R (see the arrow R2 attached to the rear wheel shafts 61L, 61R). Thus, the 2WD travel is switched to the 4WD travel that uses the front wheels 22L, 22R and the rear wheels 62L, 62R as the drive wheels.

<Switching from 4WD to 2WD>

Next, operations to switch the aforesaid 4WD travel state to the 2WD travel state will be described. The operations are performed, for example, in response to release of the stepped accelerator pedal (accelerator OFF) by the driver. That is, the torque of the engine 1 is decreased by the releasing operation of the stepped accelerator pedal (for example, the engine torque is decreased by fuel cut-off), thereby the engine 1 is turned in the driven state. In the front-side driving force transmission device 3, the forward torque is transmitted from the hypoid pinion gear 37 to the hypoid ring gear 36. As described before, when the torque is transmitted in this direction, the respective backward side engaging tooth faces make contact with each other so that the hypoid ring gear 36 goes backward to separate apart from the front differential device 2 (see the arrow attached to the hypoid ring gear 36 in FIG. 9), and thereby, the clutch mechanism 31 is actuated to be in the disengaged state. Furthermore, since the engine torque to input the propeller shaft 4 is decreased, in the rear-side driving force transmission device 5, the forward torque is transmitted from the hypoid ring gear 56 to the hypoid pinion gear 57. As described before, when the torque is transmitted in this direction, the respective backward side engaging tooth faces make contact with each other so that the hypoid ring gear 56 goes backward to separate apart from the rear differential device 6 (see the arrow attached to the hypoid ring gear 56 in FIG. 9), and thereby, the clutch mechanism 51 is actuated to be in the disengaged state.

In this way, both clutch mechanisms 31 and 51 are in the disengaged state. The torque of the engine 1 is not transmitted to the rear wheel shafts 61L, 61R (see the dashed arrow R3 added to the rear wheel shafts 61L, 61R), thereby the travel state is switched to the 2WD travel state. In this case, in the front-side driving force transmission device 3 and the rear-side driving force transmission device 5, the hypoid ring gears 36 and 56 and the hypoid pinion gear 37 and 57 are stopped, and the rotation of the propeller shaft 4 is stopped.

Also, in this embodiment, as the stepping amount of the accelerator pedal by the driver becomes lower, the engine torque transmitted to the front-side driving force transmission device 3 is decreased. Thus, in the front-side driving force transmission device 3, the backward moving distance of the hypoid ring gear 36 separating apart from the front differential device 2 is gradually increased. Also, in the rear-side driving force transmission device 5, as the stepping amount of the accelerator pedal by the driver becomes lower, the engine torque transmitted to the propeller shaft 4 is decreased, thus the backward moving distance of the hypoid ring gear 56 from the rear differential device 6 is gradually increased. For this reason, according to the stepping amount of the accelerator pedal, a driving force distribution ratio between the front wheels 22L, 22R and the rear wheels 62L, 62R can be changed according to change of the slipping amount in the clutch mechanisms 31 and 51. For example, when the stepping amount of the accelerator pedal is returned to the prescribed amount (e.g. the accelerator pedal opening degree of 30%), the driving force can be distributed to the front wheels 22L, 22R and the rear wheels 62L, 62R at the distribution ratio of 7 to 3. The relation between the accelerator pedal opening degree and the driving force distribution ratio is not limited thereto.

Furthermore, in this embodiment, the 4WD travel state can be forcibly switched to the 2WD travel state by generating forward torque in the rotor 41a of the electric motor 41 using the control signal from the ECU 100 so that the engaging tooth faces of the hypoid pinion gear 37 and the hypoid ring gear 36 are switched (switching from the engaged state of the respective forward side engaging tooth faces to the engaged state of the respective backward side engaging tooth faces). That is, when the forward torque is generated in the rotor 41a of the electric motor 41, the forward torque is transmitted from the hypoid pinion gear 37 to the hypoid ring gear 36 in the front-side driving force transmission device 3, thus the clutch mechanism 31 is turned in the disengaged state. As a result, the engine torque that is input to the propeller shaft 4 is decreased, thus in the rear-side driving force transmission device 5, the forward torque is transmitted from the hypoid ring gear 56 to the hypoid pinion gear 57. The clutch mechanism 51 is turned in the disengaged state and the drive state is switched to the 2WD travel state.

<EV Travel>

Next, description will be given on the EV travel that uses the electric motor 41 to travel. In this EV travel, during forward travel, the rear wheels 62L, 62R are used as the drive wheels, and during backward travel, the front wheels 22L, 22R are used as the drive wheels.

Figure 10:
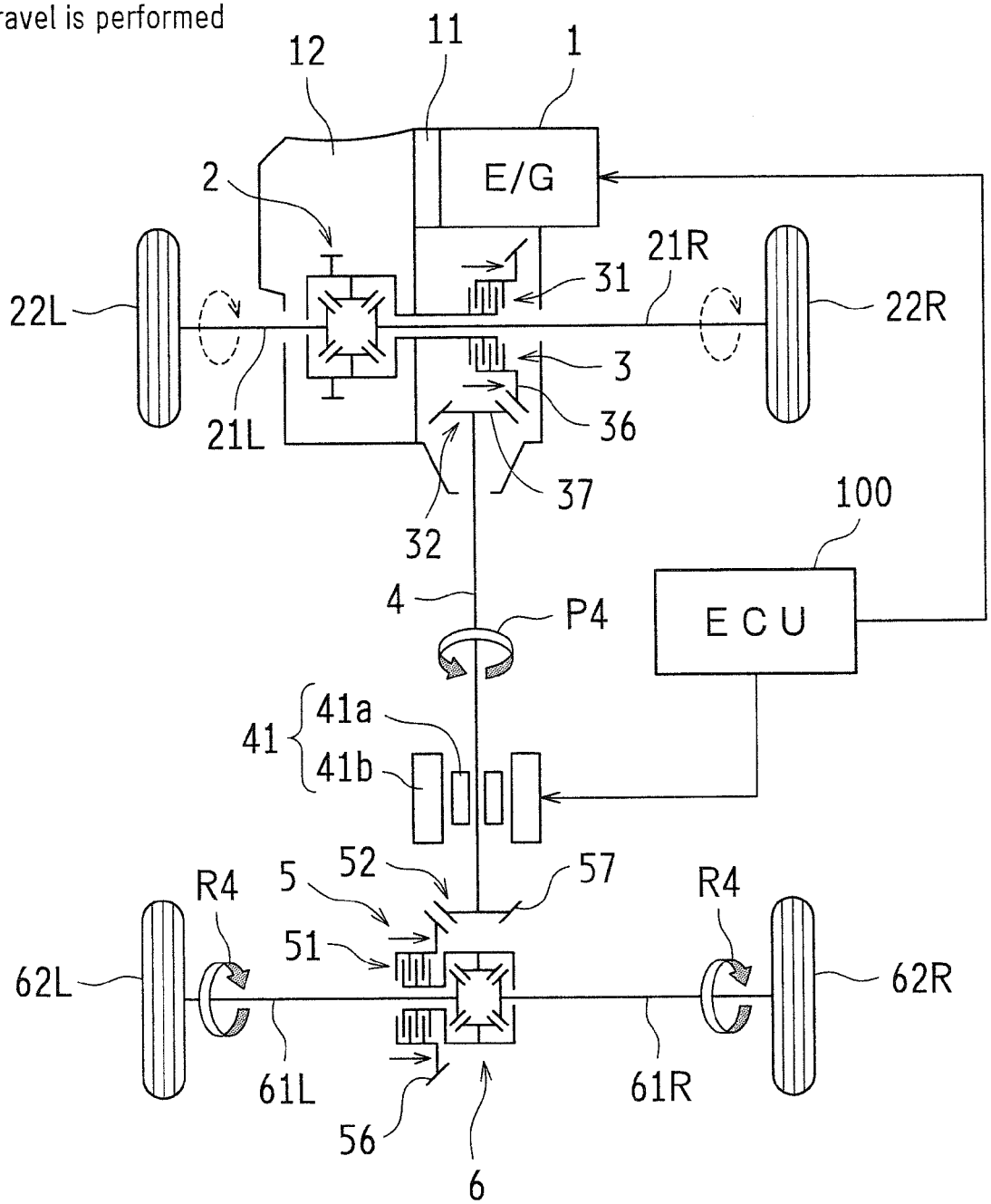
FIG. 10 is a diagram corresponding to FIG. 1 to indicate operations in an EV forward drive.

Specifically, during the EV forward travel, forward torque is generated in the rotor 41a of the electric motor 41 by a control signal from the ECU 100, as shown in FIG. 10. Thus, the propeller shaft 4 is rotated in the forward direction of the vehicle (see the arrow P4 in FIG. 10).

This rotation of the propeller shaft 4 causes, in the rear-side driving force transmission device 5, the forward torque to be transmitted from the hypoid pinion gear 57 to the hypoid ring gear 56. As described before, when the torque is transmitted in this direction, the respective forward side engaging tooth faces make contact with each other so that the hypoid ring gear 56 goes forward toward the rear differential device 6 (see the arrow added to the hypoid ring gear 56 in FIG. 10), and thereby, the clutch mechanism 51 is in the engaged state. In the front-side driving force transmission device 3, the forward torque is transmitted from the hypoid pinion gear 37 to the hypoid ring gear 36. The hypoid ring gear 36 goes backward to separate apart from the front differential device 2 (see the arrow added to the hypoid ring gear 36 in FIG. 10), and thereby, the clutch mechanism 31 is in the disengaged state. That is, only the clutch mechanism 51 of the rear-side driving force transmission device 5 is engaged by the driving force (forward driving force) of the electric motor 41, and thus, the EV forward travel, which uses the rear wheels 62L, 62R as the drive wheels, is performed (see the arrow R4 added to the rear wheel shafts 61L, 61R).

Figure 11:
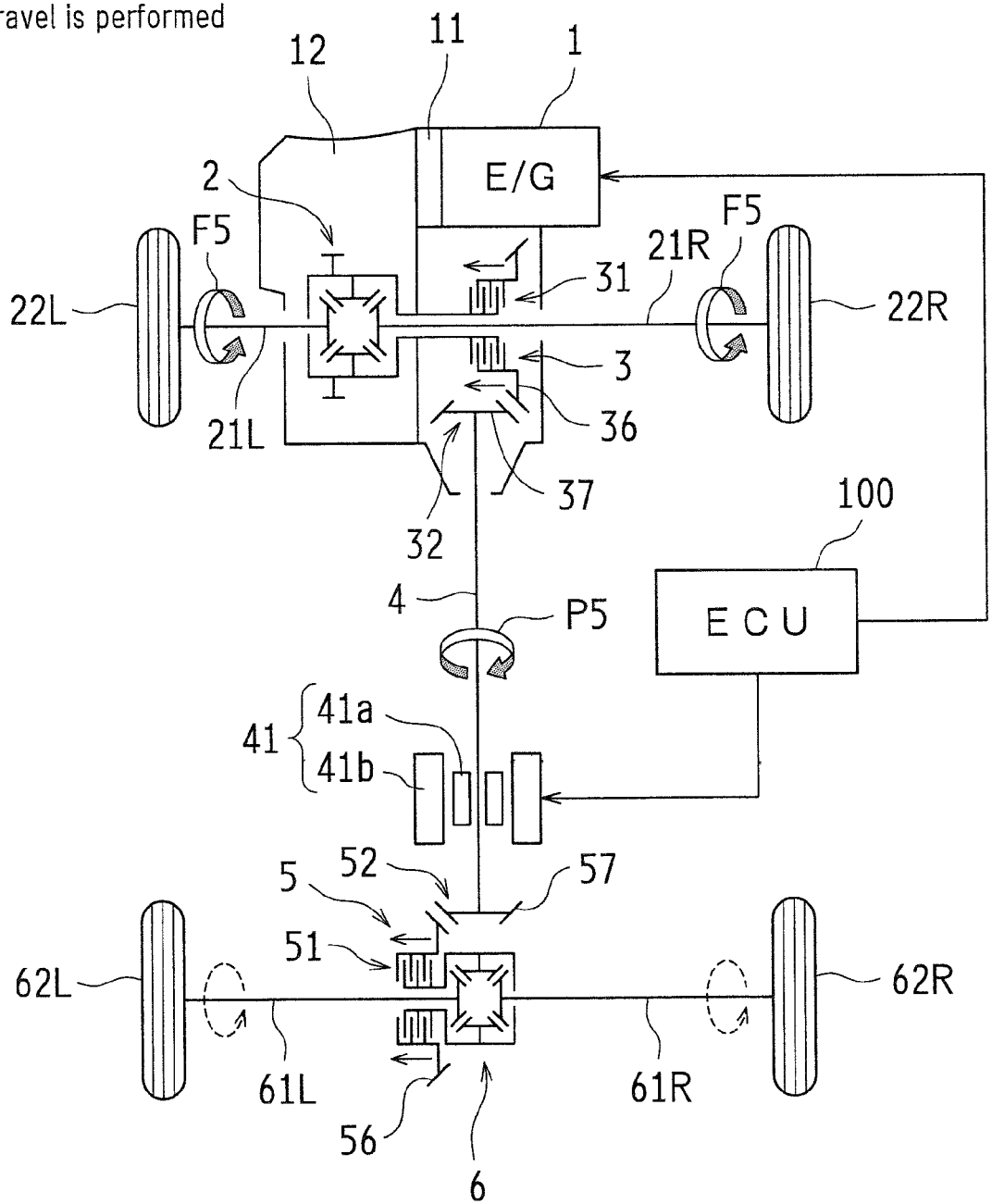
FIG. 11 is a diagram corresponding to FIG. 1 to indicate operations in an EV backward drive.

On the other hand, during the EV backward travel, backward torque is generated in the rotor 41a of the electric motor 41 by a control signal from the ECU 100, as shown in FIG. 11. Thus, the propeller shaft 4 is rotated in the backward direction of the vehicle (see the arrow P5 in FIG. 11).

This rotation of the propeller shaft 4 causes, in the front-side driving force transmission device 3, the backward torque to be transmitted from the hypoid pinion gear 37 to the hypoid ring gear 36. As described before, when the torque is transmitted in this direction, the respective forward side engaging tooth faces make contact with each other so that the hypoid ring gear 36 goes forward toward the front differential device 2 (see the arrow added to the hypoid ring gear 36 in FIG. 11), and thereby, the clutch mechanism 31 is in the engaged state. Also, in the rear-side driving force transmission device 5, the backward torque is transmitted from the hypoid pinion gear 57 to the hypoid ring gear 56, the hypoid ring gear 56 goes backward to separate apart from the rear differential device 6 (see the arrow added to the hypoid ring gear 56 in FIG. 11) and thereby, the clutch mechanism 51 is in the disengaged state. That is, only the clutch mechanism 31 of the front-side driving force transmission device 3 is engaged by the driving force (backward driving force) of the electric motor 41, and thus, the EV backward travel, which uses the front wheels 22L, 22R as the drive wheels, is performed (see the arrow F5 added to the front wheel shafts 21L, 21R).

As described above, in this embodiment, when the torque is transmitted to the hypoid gears that constitute the transfer mechanisms 32 and 52, the engagement/disengagement of the respective clutch mechanisms 31 and 51 is switched using the fact that the load (load in the axial direction) acts in the direction along the respective axial lines of the hypoid ring gears 36 and 56 according to the torque transmission direction. Thus, the travel state can be switched between the 2WD travel state and the 4WD travel state. In a conventional standby four-wheel drive vehicle (for example, vehicles disclosed in the aforesaid Patent Literatures), the front side connection/disconnection mechanism and the rear side connection/disconnection mechanism, both for switching the travel state between the 2WD travel state and the 4WD travel state, include an actuator (electronic control actuator). For this reason, each connection/disconnection mechanism is large in size as well as large in mass, the production cost thereof is high. Also, when traveling in the four-wheel drive mode, it is necessary to constantly apply current to the actuators. Therefore, when the travel is continued in the four-wheel drive mode, electrical power consumption is increased, which results in problems in the fuel consumption rate or in durability. In contrast, in the respective driving force transmission devices 3 and 5 of this embodiment, the engagement/disengagement of the clutch mechanisms 31 and 51 is switched according to the torque transmission direction. Therefore, the driving force transmission devices 3 and 5 do not have to include respective electronic control actuators, thus can be made small in size, light in weight and also low in the production cost. Furthermore, it is necessary to drive the electric motor 41 only at the time when the switching from the 2WD travel to the 4WD travel is started. It is not necessary to drive the electric motor 41 during the 4WD travel and at the time of switching the 4WD travel to the 2WD travel. Thus, electrical power consumption can be remarkably reduced. Also, in the 2WD travel state, the rotation of the propeller shaft 4 can be stopped. Thus, fluctuation or noises are not generated by the rotation of the propeller shaft 4, and the fuel consumption rate is improved by reduction of power loss. Furthermore, the EV travel can be performed using the electric motor 41 that is used at the time when the switching of the 2WD travel to the 4WD travel is started. Thus, fuel consumption can be reduced, and quietness during travel can be improved.

Second Embodiment

Next, description will be given on the second embodiment. In this embodiment, the configuration of the propeller shaft 4 differs from that of the first embodiment. Since other configurations and operations are the same as those of the first embodiment, here the description will be given on the different points from the first embodiment.

Figure 12:
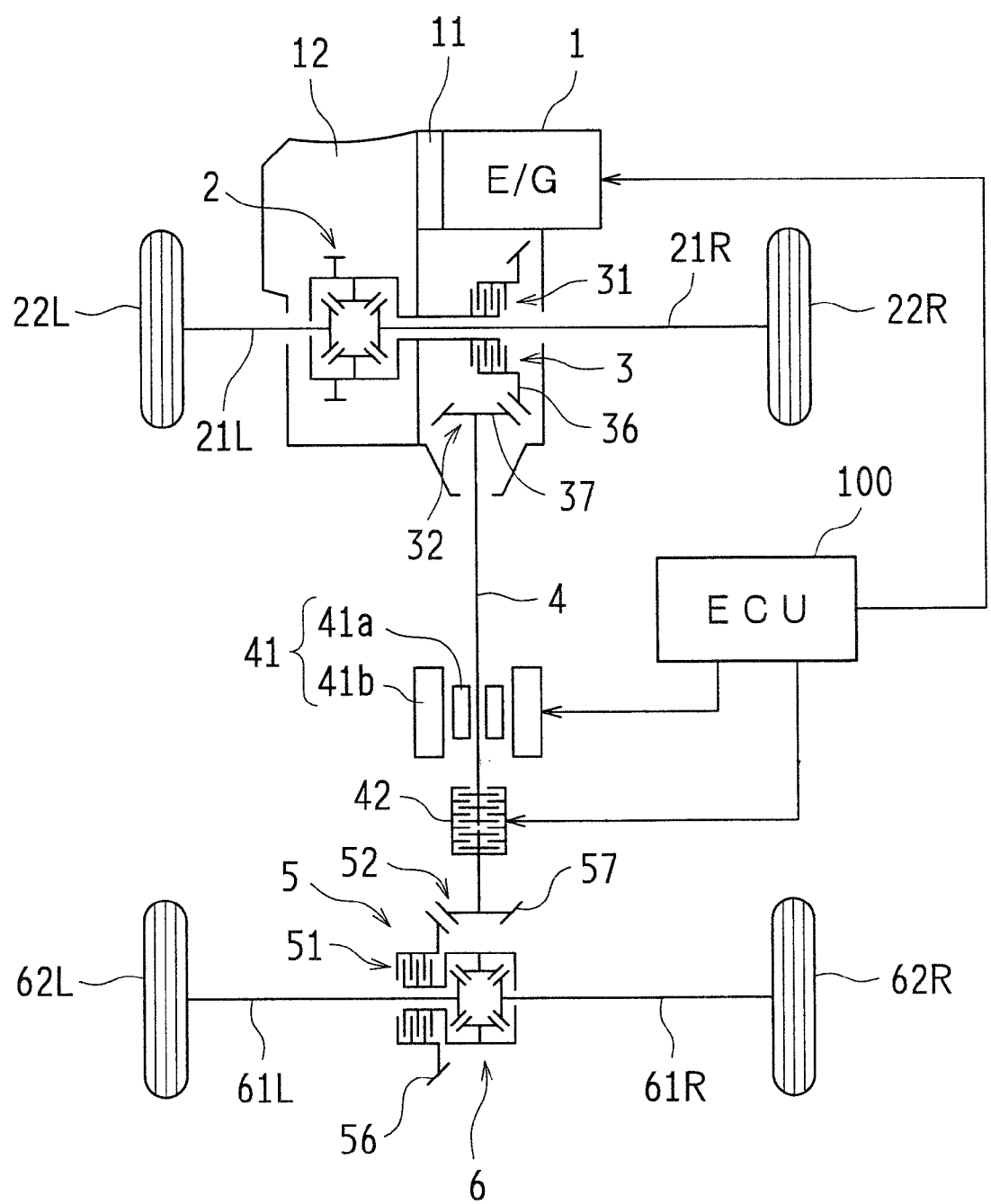
FIG. 12 is a diagram showing a schematic configuration of a drive system of a vehicle according to the second embodiment.

FIG. 12 is a diagram showing a schematic configuration of a drive system of a vehicle according to this embodiment. As shown in this diagram, the propeller shaft 4 of this embodiment includes an electronic control coupling 42 at the back of the electric motor 41.

Specifically, the electronic control coupling 42 is a pilot clutch type. For example, the electronic control coupling 42 includes a main clutch constituted by a multiple disc friction clutch, a pilot clutch (electromagnetic multiple disc clutch), a cam mechanism, an electromagnet and the like. The pilot clutch is engaged by electromagnetic force of the electromagnet, and such an engaging force is transmitted to the main clutch by the cam mechanism. Thus, the main clutch is engaged (for the specific configuration, see, for example, JP2010-254135A).

In the electronic control coupling 42, an excitation current Ie supplied to the electromagnet is controlled so that a torque capacity, i.e. a coupling torque Tc is controlled. For this reason, during the 4WD travel, the driving force distribution ratio of the rear wheels 62L, 62R relative to the total driving force can be continuously adjusted in the range of 0 to 0.5. The excitation current Ie to the electromagnet of the electronic coupling 42 is controlled by the ECU.

For example, the excitation current Ie to the electronic control coupling 42 is zero, the main clutch is disengaged (released) and the transmitted torque Tc is 0%. Thus, a drive state equal to the front-wheel drive state (two-wheel drive state by the front wheels) is realized. On the other hand, the excitation current Ie to the electronic control coupling 42 is increased, the transmitted torque Tc is increased. When the transmitted torque Tc is 100%, the driving force distribution ratio of the rear wheels 62L, 62R becomes maximum, thus a drive state equal to the directly connected four-wheel drive state is realized.

In this embodiment, the electronic control coupling 42 is provided on the propeller shaft 4, thus the driving force distribution ratio between the front wheels 22L, 22R and the rear wheels 62L, 62R can arbitrarily adjusted. Therefore, the 4WD travel can be performed with the driving force ratio that is suitable for the road surface state.

Also, in the switching from the 2WD travel to the 4WD travel, when the excitation current Ie to the electronic control coupling 42 is zero while the clutch mechanism 31 of the front-side driving force transmission device 3 is engaged by transmitting the backward torque to the propeller shaft 4, as described before, the engine torque is not transmitted to the rear-side driving force transmission device 5, and the clutch mechanism 51 is disengaged. Then, the excitation current Ie to the electronic control coupling 42 is gradually increased, the engine torque is transmitted to the rear-side driving force transmission device 5, and the clutch mechanism 51 is engaged. Therefore, the switching timing from the 2WD travel to the 4WD travel can be controlled by the excitation current Ie to the electronic control coupling 42. For example, at the time when sufficient engine torque is transmitted to the propeller shaft 4, the clutch mechanism 51 of the rear-side driving force transmission device 5 is caused to be engaged, thereby the switching from the 2WD travel to the 4WD travel can be performed.

Third Embodiment

Next, description will be given on the third embodiment. In the previously described embodiments, the clutch mechanisms 31 and 51 are respectively provided in the front-side driving force transmission device 3 and the rear-side driving force transmission device 5. In a vehicle of this embodiment, the clutch mechanism is not provided in the rear-side driving force transmission device 5. Only the front-side driving force transmission device 3 includes the clutch mechanism 31. Since other configurations and operations are the same as those of the first embodiment, here the description will be given on the different points from the first embodiment.

Figure 13:
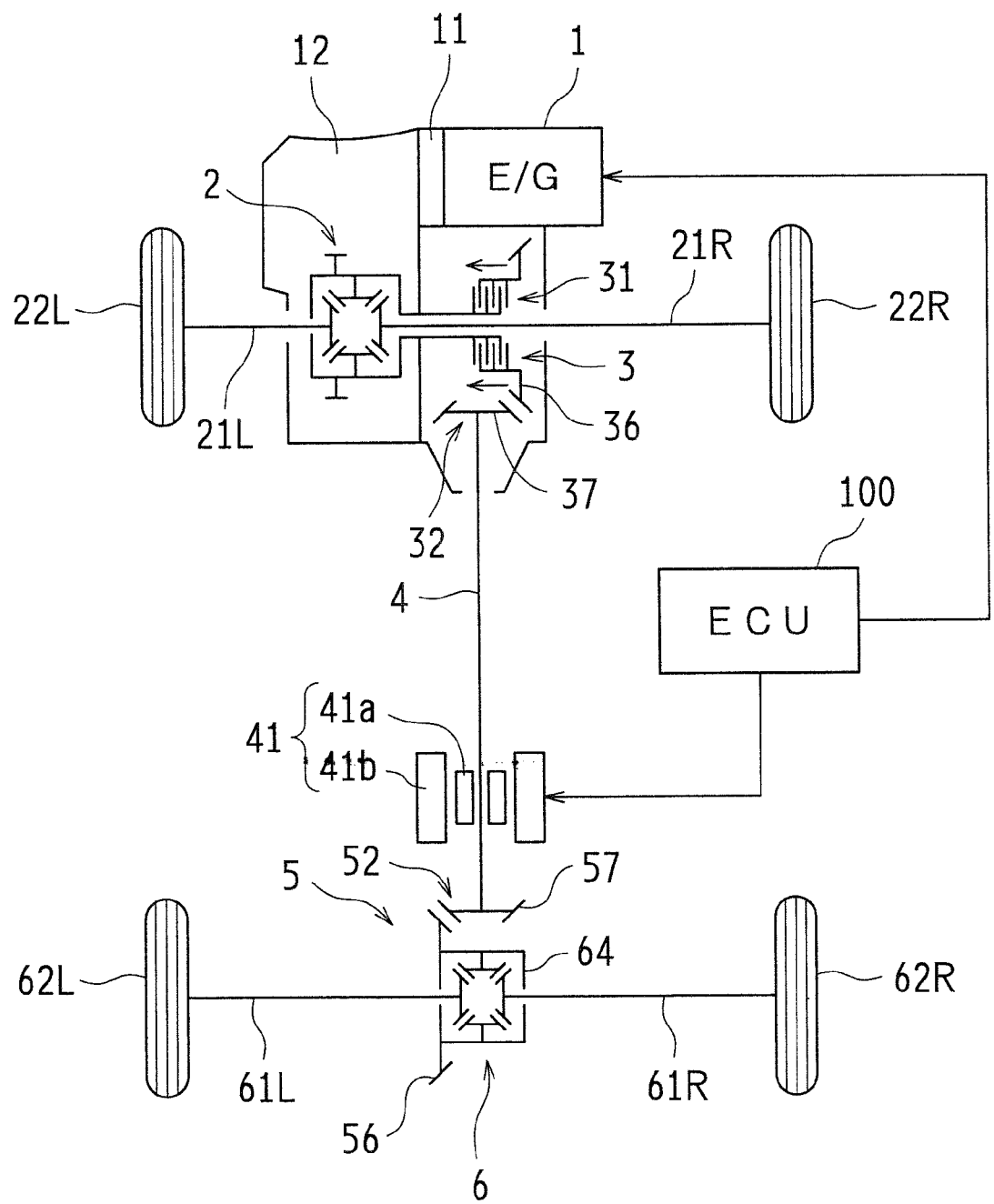
FIG. 13 is a diagram showing a schematic configuration of a drive system of a vehicle according to the third embodiment.

FIG. 13 is a diagram showing a schematic configuration of a drive system of a vehicle according to the third embodiment. As shown in this diagram, the rear-side driving force transmission device 5 does not include any clutch mechanism. The hypoid ring gear 56 of the transfer mechanism 52 is directly mounted on the differential case 64.

For this reason, in this embodiment, during the 2WD travel, the propeller shaft 4 is rotated according to the rotation of the rear wheel 62L, 62R.

Operations at the time of switching from the 2WD travel to the 4WD travel in this embodiment are following. The backward torque (in the backward travel direction of the vehicle) is generated in the rotor 41a of the electric motor 41 so as to add resistance to the rotation of the propeller shaft 4 that is rotated in the 2WD travel state (rotated in the forward direction). Thus, in the front-side driving force transmission device 3, the engaging tooth faces of the hypoid pinion gear 37 and the hypoid ring gear 36 are switched (from the engaged state of the respective backward side engaging tooth faces to the engaged state of the respective forward side engaging tooth faces). This engaged state is the same as the case in which the backward torque is transmitted from the hypoid pinion gear 37 to the hypoid ring gear 36. As described before, when the torque is transmitted in this direction, the hypoid ring gear 36 goes forward toward the front differential device 2 (see the arrow added to the hypoid ring gear 36 in FIG. 13), and thereby, the clutch mechanism 31 is engaged. In the result, similarly to the operations to switch the 2WD travel to the 4WD travel in the first embodiment, switching to the four-wheel drive is performed.

Fourth Embodiment

Figure 14:
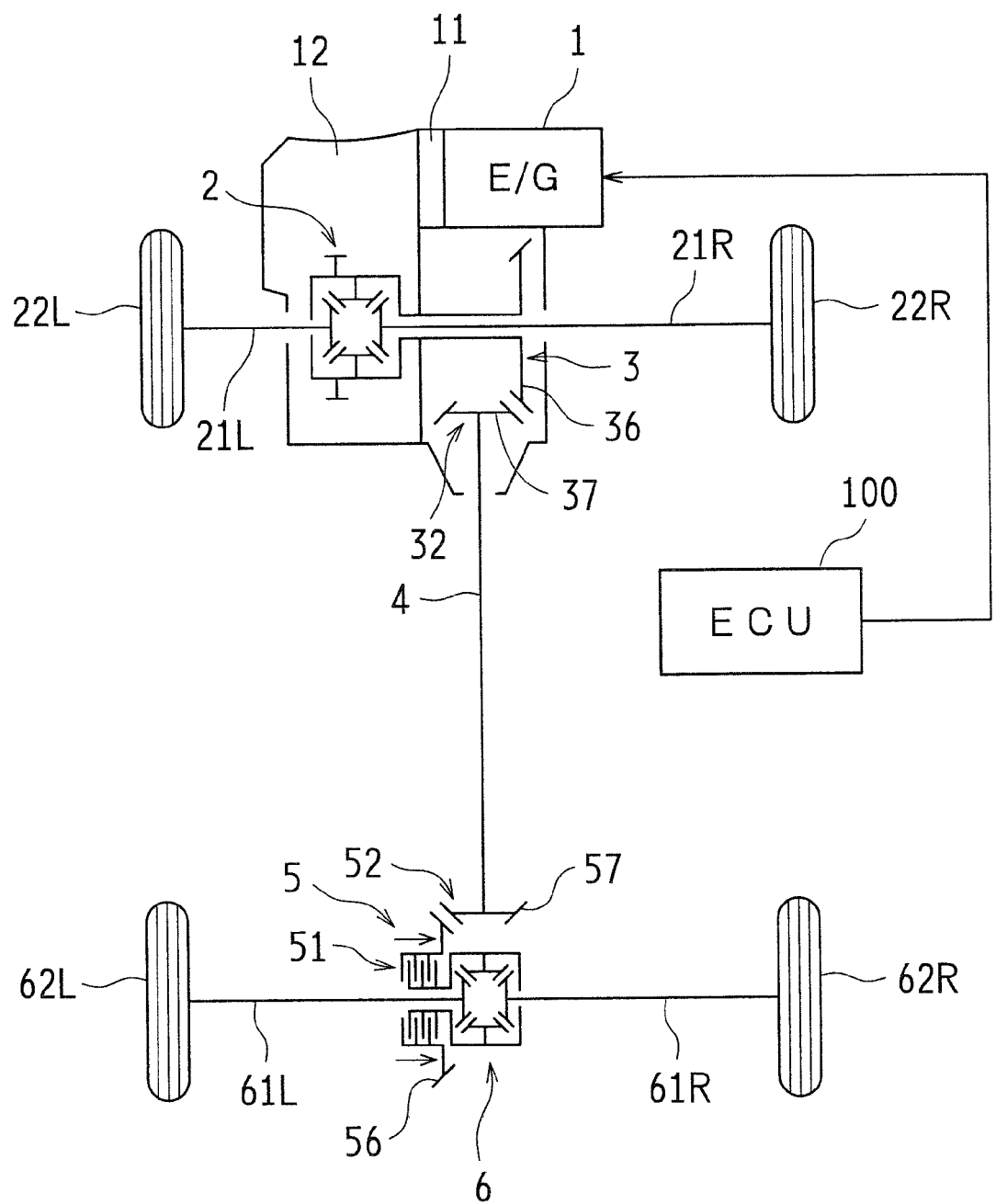
FIG. 14 is a diagram showing a schematic configuration of a drive system of a vehicle according to the fourth embodiment.

Next, description will be given on the fourth embodiment. FIG. 14 is a diagram showing a schematic configuration of a drive system of a vehicle according to the fourth embodiment. As shown in this diagram, in the vehicle of this embodiment, the clutch mechanism is not provided in the front-side driving force transmission device 3. Only the rear-side driving force transmission device 5 includes the clutch mechanism 51. Also, the propeller 4 does not include any electric motor. Since other configurations and operations are the same as those of the first embodiment, here the description will be given on the different points from the first embodiment.

In this embodiment, in the 2WD travel state, the driving force of the engine 1 is constantly transmitted to the propeller shaft 4, thereby the propeller shaft 4 is rotated.

In this embodiment, when the torque 1 is increased by the driver's stepping operation of the accelerator pedal during forward travel, rotation force of the propeller shaft 4 in the forward rotation direction is also increased. In the result, in the transfer mechanism 52 of the rear-side driving force transmission device 5, the forward torque is transmitted from the hypoid pinion gear 57 to the hypoid ring gear 56. As described above, when the torque is transmitted in this direction, the respective forward side engaging tooth faces make contact with each other so that the hypoid ring gear 56 goes forward toward the rear differential device 6 (see the arrow added to the hypoid ring gear 56 in FIG. 14), and thereby, the clutch mechanism 51 is engaged.

In this way, the rotation force of the propeller shaft 4 is transmitted to the rear wheels 62L, 62R via the transfer mechanism 52, the clutch mechanism 51, the rear differential device 6 and the rear wheel shafts 61L, 61R. Thus, the travel state is switched to the 4WD travel state that uses the front wheels 22L, 22R and the rear wheels 62L, 62R as the drive wheels.

In this embodiment, when the driver releases the stepped accelerator pedal (accelerator OFF) during the 4WD travel, the rotation force of the propeller shaft 4 in the forward rotation direction is decreased according to decrease of the torque of the engine 1. Thus, in the transfer mechanism 52 of the rear-side driving force transmission device 5, the engaging tooth faces of the hypoid pinion gear 57 and the hypoid ring gear 56 are switched (from the engaged state of the respective forward side engaging tooth faces to the engaged state of the respective backward side engaging tooth faces). This engaged state is the same as the case in which the forward torque is transmitted from the hypoid ring gear 56 to the hypoid pinion gear 57. As described before, when the torque is transmitted in this direction, the hypoid ring gear 56 goes backward to separate apart from the rear differential device 6, and thereby, the clutch mechanism 51 is disengaged. Since the clutch mechanism 51 is disengaged, the torque of the engine 1 is not transmitted to the rear wheel shafts 61L, 61R, thereby the travel state is switched to the 2WD travel state.

In this embodiment, the travel state switched to the 4WD travel state when the driver steps the accelerator pedal, and switched to the 2WD travel state when the driver releases the stepped accelerator pedal. That is, the switching operation is performed between the 4WD travel state when accelerating the vehicle and the 2WD travel state during coast travel.

Other Embodiments

In the embodiments as described above, the description has been given on the case in which the present invention is applied to a four-wheel drive vehicle that is basically an FF (front-engine front-drive) type. However, the present invention should not be limited thereto, and can be applied to a four-wheel drive vehicle that is basically an FR (front-engine rear-drive) type or that is basically an RR (rear-engine rear-drive) type.

Also, in the embodiments as described above, in both transfer mechanism 32 of the front-side driving force transmission device 3 and the transfer mechanism 52 of the rear-side driving force transmission device 5, the clutch mechanisms 31 and 51 are respectively integrally attached to the hypoid ring gears 36 and 56. However, the present invention should not be limited thereto. In either of the transfer mechanism 32 or 52, the clutch mechanism 31 (51) may be integrally attached to the hypoid pinion gear 37 (57), so that the forward/backward movement of the hypoid pinion gear 37 (57) switches the engagement/disengagement of the clutch mechanism 31 (51). Also, in both transfer mechanisms 32 and 52, the clutch mechanisms 31 and 51 may be respectively integrally attached to the hypoid pinion gears 37 and 57, so that the forward/backward movement of the hypoid pinion gears 37 and 57 switches the engagement/disengagement of the clutch mechanisms 31 and 51.

In the embodiments as described above, the rotation axis center O2 of the hypoid pinion gears 37 and 57 is located in a position lower than the rotation axis center O1 of the hypoid ring gears 36 and 56. However, the present invention should not be limited thereto. The rotation axis center O2 of the hypoid pinion gears 37 and 57 may be located in a position higher than the rotation axis center O1 of the hypoid ring gears 36 and 56.

The type of the clutch mechanisms 31 and 51 is not limited to the wet multiple disc clutch. Various type clutch mechanisms may be applied, such as a cone clutch.

In the embodiments as described above, the clutch discs 34 and 54 are spline fit to the respective inner peripheral surfaces of the clutch cases 35 and 55. However, the present invention should not be limited thereto. The clutch mechanisms 31 and 51 may be include respective cylinders movable along the axis center direction thereof. The clutch discs 34 and 54 may be spline fit respectively to the inner peripheral surfaces of the cylinders. In this case, the respective cylinders are integrally attached to the hypoid ring gears 36 and 56, thus the respective cylinders move forward/backward according to the forward/backward movement of the hypoid ring gears 36 and 56.

INDUSTRIAL APPLICABILITY

The present invention is suitably applied to a vehicle that has clutch mechanisms on the front and rear portions of a propeller shaft and that can selectively switch a drive state between the two-wheel drive state and the four-wheel drive state.

DESCRIPTION OF REFERENCE NUMERALS

1 Engine (driving force source)
22L, 22R Front wheel
3 Front-side driving force transmission device
4 Propeller shaft
41 Electric motor
5 Rear-side driving force transmission device
31, 51 Clutch mechanism (engaging/disengaging unit)
32, 52 Transfer mechanism (paired spiral bevel gear)
36, 56 Hypoid ring gear (first spiral bevel gear)
37, 57 Hypoid pinion gear (second spiral bevel gear)
62L, 62R Rear wheel

The invention claimed is:
1. A driving force transmission device comprising:
an engaging/disengaging unit capable of changing transmission of torque by operating along an rotation axis center thereof;
a first spiral bevel gear attached to the engaging/disengaging unit so as to rotate together with the engaging/disengaging unit; and
a second spiral bevel gear constituting, with the first spiral bevel gear, a paired spiral bevel gear that are hypoid gears by engaging with each other,
wherein the first spiral bevel gear is moved along a rotation axis center thereof according to engaging tooth faces at a time when power is transmitted between the first spiral bevel gear and the second spiral bevel gear, and accordingly, the engaging/disengaging unit operates along the rotation axis center thereof, and
wherein an operation direction of the engaging/disengaging unit along the rotation axis center thereof according to the engaging tooth faces of the respective spiral bevel gears is determined by a pressure angle and a helix angle of teeth of each of the spiral bevel gears, and an offset size between the rotation axis center of the first spiral bevel gear and that of the second spiral bevel gear.

2. The driving force transmission device according to claim 1,
wherein the first spiral bevel gear is moved along the rotation axis center thereof so that the engaging/disengaging unit operates to be in an engaging side, while respective engaging tooth faces of the first spiral bevel gear and the second spiral bevel gear make contact with each other to transmit power, and
wherein the respective engaging tooth faces are used, among the tooth faces, for performing a normal rotation by receiving driving force from a driving force source.

3. The driving force transmission device according to claim 1,
wherein the first spiral bevel gear is moved along the rotation axis center thereof so that the engaging/disengaging unit operates to be in an disengaging side, while respective engaging tooth faces of the first spiral bevel gear and the second spiral bevel gear make contact with each other to transmit power, and
wherein the respective engaging tooth faces are used, among the tooth faces, for performing a normal rotation when a driving force source is in a driven state.

4. A vehicle including a driving force transmission device, the driving force transmission device including an engaging/disengaging unit capable of changing transmission of torque by operating along an rotation axis center thereof; a first spiral bevel gear attached to the engaging/disengaging unit so as to rotate together with the engaging/disengaging unit; and a second spiral bevel gear constituting, with the first spiral bevel gear, a paired spiral bevel gear that are hypoid gears by engaging with each other, wherein the first spiral bevel gear is moved along a rotation axis center thereof according to engaging tooth faces at a time when power is transmitted between the first spiral bevel gear and the second spiral bevel gear, and accordingly, the engaging/disengaging unit operates along the rotation axis center thereof,
the vehicle comprising:
a driving force source outputting driving force for travel,
wherein, when torque transmitted from the driving force source to the paired spiral bevel gear is larger than torque that the wheels receive from a road surface, respective forward side engaging tooth faces of the first spiral bevel gear and the second spiral bevel gear make contact with each other so that the first spiral bevel gear is moved in one direction along the rotation axis center thereof, thereby the engaging/disengaging unit operates to be in an engaging side, and
wherein, when the torque transmitted from the driving force source to the paired spiral bevel gear is smaller than the torque that the wheels receive from the road surface, respective backward side engaging tooth faces of the first spiral bevel gear and the second spiral bevel gear make contact with each other so that the first spiral bevel gear is moved in the other direction along the rotation axis center thereof, thereby the engaging/disengaging unit operates to be in an disengaging side.

5. A vehicle including the driving force transmission device according to claim 4,
wherein a propeller shaft that extends in a forward-backward direction of a vehicle body includes the respective driving force transmission devices on a front end side and a rear end side, and an electric motor that gives rotation force to the propeller shaft,
wherein, during a two-wheel drive state in which the respective engaging/disengaging units of the driving force transmission devices are in the disengaged state, rotation force in the backward direction of the vehicle is given to the propeller shaft by the electric motor, and in the driving force transmission device provided on the front end side of the propeller shaft, the forward side engaging tooth faces of the first spiral bevel gear and the second spiral bevel gear make contact with each other so that the engaging/disengaging unit operates to be in the engaging side, and
wherein by such an operation of the engaging/disengaging unit to be in the engaging side, rotation force in the forward direction of the vehicle is given to the propeller shaft by the driving force from the driving force source, and in the driving force transmission device provided on the rear end side of the propeller shaft, the forward side engaging tooth faces of the first spiral bevel gear and the second spiral bevel gear make contact with each other so that the engaging/disengaging unit operates to be in the engaging side, accordingly a drive state is switched to a four-wheel drive state.

6. A vehicle including the driving force transmission device according to claim 5,
wherein, during the four-wheel drive state in which the respective engaging/disengaging units of the driving force transmission devices are in the engaged state, the driving force source is turned in a driven state by a driver's accelerator OFF operation, and in the driving force transmission device provided on the front end side of the propeller shaft, the backward side engaging tooth faces of the first spiral bevel gear and the second spiral bevel gear make contact with each other so that the engaging/disengaging unit operates to be in the disengaging side, and
wherein by such an operation of the engaging/disengaging unit to be in the disengaging side, the torque that is transmitted from the driving force source to the paired spiral bevel gear in the driving force transmission device provided on the rear end side of the propeller shaft is smaller than the torque that the wheels receive from the road surface, and the backward side engaging tooth faces of the first spiral bevel gear and the second spiral bevel gear make contact with each other so that the engaging/disengaging unit operates to be in the disengaging side, accordingly the drive state is switched to the two-wheel drive state.

7. A vehicle including the driving force transmission device according to claim 5,
wherein, when the driving force source is stopped, the rotation force in the forward direction of the vehicle is given to the propeller shaft by the electric motor, and in the driving force transmission device provided on the rear end side of the propeller shaft, the forward side engaging tooth faces of the first spiral bevel gear and the second spiral bevel gear make contact with each other so that the engaging/disengaging unit operates to be in the engaging side, and
wherein by such an operation of the engaging/disengaging unit to be in the engaging side, a forward travel using the rear wheels as drive wheels can be performed by the rotation force in the forward direction generated by the electric motor.

8. A vehicle including the driving force transmission device according to claim 5,
wherein, when the driving force source is stopped, the rotation force in the backward direction of the vehicle is given to the propeller shaft by the electric motor, and in the driving force transmission device provided on the front end side of the propeller shaft, the forward side engaging tooth faces of the first spiral bevel gear and the second spiral bevel gear make contact with each other so that the engaging/disengaging unit operates to be in the engaging side, and wherein by such an operation of the engaging/disengaging unit to be in the engaging side, a backward travel using the front wheels as drive wheels can be performed by the rotation force in the backward direction generated by the electric motor.

9. A vehicle including the driving force transmission device according to claim 5, wherein the propeller shaft includes an electronic control coupling that can change a transmission amount of the driving force to the rear wheels by changing a driving force distribution ratio between the front wheels and the rear wheels.

10. A vehicle including the driving force transmission device according to claim 4, wherein the propeller shaft, which extends in a forward-backward direction of the vehicle body, includes the driving force transmission device only on a front end side of the front and rear end sides.

11. A vehicle including the driving force transmission device according to claim 4, wherein the propeller shaft, which extends in a forward-backward direction of the vehicle body, includes the driving force transmission device only on a rear end side of the front and rear end sides.

12. A vehicle including the driving force transmission device comprising:

an engaging/disengaging unit capable of changing transmission of torque by operating along an rotation axis center thereof;

a first spiral bevel gear attached to the engaging/disengaging unit so as to rotate together with the engaging/disengaging unit; and a second spiral bevel gear constituting a paired spiral bevel gear with the first spiral bevel gear by engaging with each other, wherein the first spiral bevel gear is moved along a rotation axis center thereof according to engaging tooth faces at a time when power is transmitted between the first spiral bevel gear and the second spiral bevel gear, and accordingly, the engaging/disengaging unit operates along the rotation axis center thereof, the vehicle including the driving force transmission device also including a driving force source outputting driving force for travel, wherein, when torque transmitted from the driving force source to the paired spiral bevel gear is larger than torque that the wheels receive from a road surface, respective forward side engaging tooth faces of the first spiral bevel gear and the second spiral bevel gear make contact with each other so that the first spiral bevel gear is moved in one direction along the rotation axis center thereof, thereby the engaging/disengaging unit operates to be in an engaging side, and wherein, when the torque transmitted from the driving force source to the paired spiral bevel gear is smaller than the torque that the wheels receive from the road surface, respective backward side engaging tooth faces of the first spiral bevel gear and the second spiral bevel gear make contact with each other so that the first spiral bevel gear is moved in the other direction along the rotation axis center thereof, thereby the engaging/disengaging unit operates to be in an disengaging side.

* * * * *